(12) United States Patent
Wang et al.

(10) Patent No.: US 12,149,365 B2
(45) Date of Patent: *Nov. 19, 2024

(54) METHOD AND DEVICE FOR TRANSMITTING UPLINK CONTROL INFORMATION

(71) Applicant: Samsung Electronics Co., Ltd., Suwon-si (KR)

(72) Inventors: Yi Wang, Beijing (CN); Jingxing Fu, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 18/353,403

(22) Filed: Jul. 17, 2023

(65) Prior Publication Data
US 2024/0022359 A1 Jan. 18, 2024

Related U.S. Application Data

(63) Continuation of application No. 16/727,292, filed on Dec. 26, 2019, now Pat. No. 11,705,995.

(30) Foreign Application Priority Data

Dec. 28, 2018 (CN) .......................... 201811632532.1
Apr. 30, 2019 (CN) .......................... 201910367042.1
Nov. 7, 2019 (CN) .......................... 201911086662.4

(51) Int. Cl.
*H04L 1/18* (2023.01)
*H04L 1/1812* (2023.01)
(Continued)

(52) U.S. Cl.
CPC .......... *H04L 1/1861* (2013.01); *H04L 1/1819* (2013.01); *H04L 1/1854* (2013.01);
(Continued)

(58) Field of Classification Search
CPC ... H04L 1/1861; H04L 5/0055; H04L 1/1854; H04L 1/1819; H04L 5/0007; H04L 1/1896; H04W 72/0413
See application file for complete search history.

(56) References Cited

U.S. PATENT DOCUMENTS

2017/0215202 A1 7/2017 Yang et al.
2018/0042015 A1 2/2018 Mn et al.
(Continued)

FOREIGN PATENT DOCUMENTS

CN 108271262 A 7/2018
WO 2017/099835 A1 6/2017

OTHER PUBLICATIONS

3GPP TSG RAN WG1 Meeting #95, CAICT, 'Enhancements to UCI to support URLLC', R1-1813507, Spokane, USA. Dated Nov. 2, 2018.
(Continued)

*Primary Examiner* — Lakeram Jangbahadur
(74) *Attorney, Agent, or Firm* — Jefferson IP Law, LLP

(57) ABSTRACT

A method for transmitting uplink control information is provided. The method includes receiving a Physical Downlink Shared Channel (PDSCH), determining Physical Uplink Control Channel (PUCCH) resources for feeding back Hybrid Automatic repeat Request Acknowledgement (HARQ-ACK) information of the PDSCH, and transmitting a HARQ-ACK of the PDSCH on the PUCCH resources according to at least one of HARQ-ACK timing information, the time domain duration of scheduling unit in a downlink bandwidth part and an uplink bandwidth part, or PUCCH resource indication information. The embodiments of the application further propose a corresponding user equipment and a corresponding computer storage medium.

20 Claims, 24 Drawing Sheets

(51) Int. Cl.
*H04L 1/1829* (2023.01)
*H04L 5/00* (2006.01)
*H04W 72/21* (2023.01)

(52) U.S. Cl.
CPC .......... *H04L 5/0055* (2013.01); *H04W 72/21* (2023.01); *H04L 5/0007* (2013.01)

(56) References Cited

U.S. PATENT DOCUMENTS

| | | | |
|---|---|---|---|
| 2018/0109360 A1 | 4/2018 | Sun et al. | |
| 2018/0205504 A1 | 7/2018 | Lyu et al. | |
| 2019/0230685 A1 | 7/2019 | Park et al. | |
| 2019/0289586 A1 | 9/2019 | Ouchi et al. | |
| 2019/0320422 A1* | 10/2019 | Al-Imari | H04W 72/23 |
| 2019/0349942 A1 | 11/2019 | Li et al. | |
| 2020/0092068 A1 | 3/2020 | Yang et al. | |
| 2020/0120642 A1* | 4/2020 | Hwang | H04W 72/04 |
| 2020/0344032 A1* | 10/2020 | Yang | H04L 5/0053 |
| 2020/0389873 A1* | 12/2020 | Liu | H04W 72/12 |
| 2021/0159948 A1* | 5/2021 | Li | H04L 1/0023 |
| 2021/0235481 A1* | 7/2021 | Takeda | H04L 5/0053 |

OTHER PUBLICATIONS

3GPP TSG RAN WG1 Meeting #94, Huawei et al., 'HARQ enhancements in NR unlicensed', R1-1808063, Huawei, HiSilicon, Gothenburg, Sweden. Dated Aug. 10, 2018.

3GPP TSG RAN WG1 Meeting #94, Interdigital Inc., 'On HARQ Enhancements for NR-U', R1-1809091, Gothenburg, Sweden. Dated Aug. 11, 2018.

International Search Report and Written Opinion dated Apr. 7, 2020, Issued In International Application No. PCT/KR2019/018639.

Sharp et al: "Reduced processing time for different UL and DL sTTI lengths", 3GPP Draft; R1-167614, 3rd Generation Partnership Project (3GPP), Mobile Competence Centre; 650, Route Des Lucioles; F-06921 Sophia-Antipolis Cedex; France, vol. RAN WG1, No. Gothenburg, Sweden; Aug. 22, 2016-Aug. 26, 2016 Aug. 21, 2016 (Aug. 21, 2016), XP051140758.

Huawei et al: "Corrections on timing from sPDSCH to HARQ-ACK for SSC3,4,8", 3GPP Draft; R1-1807312, 3rd Generation Partnership Project (3GPP), Mobile Competence Centre; 650, Route Des Lucioles; F-06921 Sophia-Antipolis Cedex; France, vol. RAN WG1, No. Busan. Korea; May 21, 2018-May 25, 2018 May 20, 2018 (May 20, 2018), XP051442507.

NTT Docomo et al.: "Scheduling and HARQ for URLLC low latency", 3GPP Draft; R1-1705752, 3rd Generation Partnership Project (3GPP), Mobile Competence Centre; 650, Route Des Lucioles; F-06921 Sophia-Antipolis Cedex; France vol. RAN WG1, No. Spokane, USA; Apr. 3, 2017-Apr. 7, 2017 Apr. 2, 2017 (Apr. 2, 2017), XP051243867.

European Search Report dated Aug. 25, 2021, issued in European Application No. 19903319.2.

Chinese Office Action dated Apr. 21, 2023, issued in Chinese Application No. 201911086662.4.

* cited by examiner

METHOD AND DEVICE FOR TRANSMITTING UPLINK CONTROL INFORMATION

CROSS-REFERENCE TO RELATED APPLICATION(S)

This application is a continuation application of prior application Ser. No. 16/727,292, filed on Dec. 26, 2019, which has issued as U.S. Pat. No. 11,705,995 on Jul. 18, 2023 and is based on and claims priority under 35 U.S.C § 119(a) of a Chinese patent application number 201811632532.1, filed on Dec. 28, 2018, in the China National Intellectual Property Administration, a Chinese patent application number 201910367042.1, filed on Apr. 30, 2019, in the China National Intellectual Property Administration, and a Chinese patent application number 201911086662.4, filed on Nov. 7, 2019, in the China National Intellectual Property Administration, the disclosure of each of which is incorporated by reference herein in its entirety.

BACKGROUND

1. Field

The disclosure relates to the field of wireless communication technologies. More particularly, the disclosure relates to a method and device for transmitting uplink control information, and a storage medium.

2. Description of Related Art

With the rapid development of the information industry, especially the increasing demands from the mobile Internet and Internet of Things (IoT), it may bring unprecedented challenges to future mobile communication technologies. In response to the unprecedented challenges, the communications industry and academia have launched extensive research on 2020 orientated 5th Generation (5G) mobile communications technology. According to work plans of the 3rd Generation Partnership Project (3GPP) organization, works for the 5G during a first phase have basically ended, and works for the 5G during a second phase are in progress.

In the works during the second phase, how to effectively support low-latency services is an important research direction. How to effectively support transmission of Hybrid Automatic Repeat Request Acknowledgement information (HARQ-ACK) of the low-latency services, especially how to support multiple Physical Uplink Control Channels (PUCCHs) or Physical Uplink Shared Channels (PUSCHs) within one slot to carry HARQ-ACKs of different Physical Downlink Shared Channels (PDSCHs), is a new problem to be addressed.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below. Accordingly, an aspect of the disclosure is to provide a method and device for transmitting uplink control information, and a storage medium.

In accordance with an aspect of the disclosure, a method for transmitting uplink control information is provided. The method includes receiving a Physical Downlink Shared Channel (PDSCH), determining Physical Uplink Control Channel (PUCCH) resources for feeding back Hybrid Automatic repeat Request Acknowledgement (HARQ-ACK) information of the PDSCH, and transmitting a HARQ-ACK of the PDSCH on the PUCCH resources according to at least one of HARQ-ACK timing information, the time domain duration of scheduling unit in a downlink bandwidth part and an uplink bandwidth part, and PUCCH resource indication information.

In some embodiments, transmitting a HARQ-ACK of the PDSCH on the PUCCH resources according to at least one of HARQ-ACK timing information, the time domain duration of scheduling unit in a downlink bandwidth part and an uplink bandwidth part, and PUCCH resource indication information comprises determining, based on the HARQ-ACK feedback timing, a downlink slot set associated with HARQ-ACK locations in a HARQ-ACK codebook, determining, for each downlink slot in the slot set, a location of a HARQ-ACK in the HARQ-ACK codebook corresponding to each candidate PDSCH reception, and transmitting the HARQ-ACK on the PUCCH resources based on the determined HARQ-ACK codebook.

In some embodiments, when the uplink slot and the downlink slot have the same slot length, the HARQ-ACK feedback timing comprises transmitting, in a sub-slot n of the uplink bandwidth part, a corresponding HARQ-ACK of a PDSCH transmitted in a slot p of the downlink bandwidth part, wherein mod $(n-K1-L+1, L)=0$, where K1 is a latency between the PDSCH and the corresponding HARQ-ACK, a granularity of K1 is a sub-slot of the uplink bandwidth part, and L is a number of sub-slots in one slot in the uplink bandwidth part, and determining, based on the HARQ-ACK feedback timing, a downlink slot set associated with HARQ-ACK locations in a HARQ-ACK codebook comprises for K1 in the set K, determining the slot set in the HARQ-ACK codebook which needs to be allocated HARQ-ACK locations to be $\{(n-K1-L+1)/(L)\}$, where $K1 \in K$, and K1 in the set K satisfies mod $(n-K1-L+1,L)=0$.

In some embodiments, when the uplink slot and the downlink slot have the same slot length, the HARQ-ACK feedback timing comprises transmitting, in a sub-slot n of the uplink bandwidth part, a corresponding HARQ-ACK of a PDSCH transmitted in a slot p of the downlink bandwidth part, wherein $n=L \cdot p+l+K1$, where $l \in \{0, 1, \ldots L-1\}$, a granularity of K1 is a sub-slot of the uplink bandwidth part, and L is a number of sub-slots in one slot in the uplink bandwidth part, and determining, based on the HARQ-ACK feedback timing, a downlink slot set associated with HARQ-ACK locations in a HARQ-ACK codebook comprises for each K1, determining the slot set in the HARQ-ACK codebook which needs to be allocated HARQ-ACK locations to be $K_D=\{\text{floor } ((n-K1)/L)\}$, where $K1 \in K$.

In some embodiments, when the uplink slot and the downlink slot have the same slot length, the HARQ-ACK feedback timing comprises transmitting, in a sub-slot n of the uplink bandwidth part, a corresponding HARQ-ACK of a PDSCH transmitted in a slot p of the downlink bandwidth part, wherein $n=L \cdot (p+K1)+l$, where $l \in \{0, 1, \ldots L-1\}$, a granularity of K1 is a slot of the uplink bandwidth part, and L is a number of sub-slots in one slot in the uplink bandwidth part, determining, based on the HARQ-ACK feedback timing, a downlink slot set associated with HARQ-ACK locations in a HARQ-ACK codebook comprises for each K1, determining the slot set in the HARQ-ACK codebook which needs to be allocated HARQ-ACK locations to be KD={r−K1}, where K1∈K, and r is an uplink slot corresponding to the HARQ-ACK to be transmitted, and the method further comprises determining, based on time resource information for determining the PUCCH resources, which sub-slot in the slot r the PUCCH for transmitting the HARQ-ACK is located in.

In some embodiments, when the uplink slot and the downlink slot have different slot lengths, the HARQ-ACK feedback timing comprises transmitting, in a sub-slot n of the uplink bandwidth part, a corresponding HARQ-ACK of a PDSCH transmitted in a slot p of the downlink bandwidth part, wherein mod ((n−K1−M*L+1), M*L)=0, where K1 is a latency between the PDSCH and the corresponding HARQ-ACK, a granularity of K1 is a sub-slot of the uplink bandwidth part, L is a number of sub-slots in one slot in the uplink bandwidth part, and M is a ratio of a length of a downlink slot to a length of an uplink slot, and determining, based on the HARQ-ACK feedback timing, a downlink slot set associated with HARQ-ACK locations in a HARQ-ACK codebook comprises for each K1, determining the slot set in the HARQ-ACK codebook which needs to be allocated HARQ-ACK locations to comprise KD={(n−K1−M*L+1)/(M*L)}, where K1∈K, and K1 used in the set K satisfies mod((n−K1−M*L+1),M*L)=0.

In some embodiments, when the uplink slot and the downlink slot have different slot lengths, the HARQ-ACK feedback timing comprises transmitting, in a sub-slot n of the uplink bandwidth part, a corresponding HARQ-ACK of a PDSCH transmitted in a slot p of the downlink bandwidth part, wherein n=floor (L·M)·p+l+K1, where l∈ {0, 1, . . . L·M−1}, a granularity of K1 is a sub-slot of the uplink bandwidth part, L is a number of sub-slots in one slot in the uplink bandwidth part, and M is a ratio of a length of a downlink slot to a length of an uplink slot, and determining, based on the HARQ-ACK feedback timing, a downlink slot set associated with HARQ-ACK locations in a HARQ-ACK codebook comprises for each K1, determining the slot set in the HARQ-ACK codebook which needs to be allocated HARQ-ACK locations to be KD={floor ((n−K1)/L/M)}, where K1∈K.

In some embodiments, when the uplink slot and the downlink slot have different slot lengths, the HARQ-ACK feedback timing comprises transmitting, in a sub-slot n of the uplink bandwidth part, a corresponding HARQ-ACK of a PDSCH transmitted in a slot p of the downlink bandwidth part, wherein n=L·((M·p)+K1)+l, where l∈{0, 1, . . . L·M−1}, a granularity of K1 is a slot of the uplink bandwidth part, L is a number of sub-slots in one slot in the uplink bandwidth part, and M is a ratio of a length of a downlink slot to a length of an uplink slot, and determining, based on the HARQ-ACK feedback timing, a downlink slot set associated with HARQ-ACK locations in a HARQ-ACK codebook comprises for each K1, determining the slot set in the HARQ-ACK codebook which needs to be allocated HARQ-ACK locations to be $$KD=(r-K1)/M+m, \text{ if } M\leq 1, \text{ where } m=0,1,\ldots 1/M-1;$$
and KD={floor ((r−K1)/M} or KD={(r−K1−M+1)/M}, if M>1, where a granularity of K1 is a slot of the uplink bandwidth part, and K1∈K, and the method further comprises determining, based on time resource information for determining the PUCCH resources, which sub-slot n in the slot r the PUCCH for transmitting the HARQ-ACK is located in, wherein r is an uplink slot corresponding to the HARQ-ACK to be transmitted.

In some embodiments, determining, for each downlink slot in the slot set, a location of a HARQ-ACK corresponding to each candidate PDSCH reception in the HARQ-ACK codebook comprises determining, for each downlink slot kd in the slot set, a location of a HARQ-ACK corresponding to one or more PDSCHs in a downlink slot kd.

In some embodiments, determining a location of a HARQ-ACK corresponding to one or more PDSCHs in the downlink slot kd comprises allocating, for the downlink slot kd, a HARQ-ACK location to a PDSCH having a last Orthogonal Frequency Division Multiplexing (OFDM) symbol located in an uplink sub-slot (L·M)·kd+q according to slots or sub-slots of the uplink bandwidth part, no matter whether there is K1 in the set K of K1 which satisfies (L·M)·kd+q+K1=n, where 0≤q<L·M, or allocating, for the downlink slot kd, a HARQ-ACK location to a PDSCH having a last OFDM symbol located in an uplink sub-slot (L·M)·kd+q, only when it is determined that there is K1 in the set K of K1 which satisfies (L·M)·kd+q+K1=n, where 0≤q<L·M, and n is an uplink sub-slot for transmitting a HARQ-ACK.

In some embodiments, determining a location of a HARQ-ACK corresponding to one or more PDSCHs in the downlink slot kd further comprises determining that the HARQ-ACK codebook does not comprise a HARQ-ACK location of a PDSCH for which the end location of its last OFDM symbol is located behind an uplink sub-slot n, or the HARQ-ACK codebook does not comprise a HARQ-ACK location of a PDSCH for which the end location of its last OFDM symbol is not in the front of a start point of the uplink sub-slot n.

In some embodiments, the HARQ-ACK feedback timing comprises, for one PDSCH of a slot p of the downlink bandwidth part, a last OFDM symbol of a sub-slot L·p+L−1 of the uplink bandwidth part being overlapped with a last OFDM symbol of the slot p of the downlink bandwidth part, so that K1 corresponding to the sub-slot L·p+L−1 of the uplink bandwidth part is equal to 0, or, for one PDSCH of the slot p of the downlink bandwidth part, a last OFDM symbol of the PDSCH being located in a sub-slot n=L·p+l of the uplink bandwidth part, so that K1 corresponding to the sub-slot n of the uplink bandwidth part is equal to 0.

In some embodiments, the HARQ-ACK feedback timing comprises, for one PDSCH of a slot p of the downlink bandwidth part, a last OFDM symbol of a sub-slot (L·M) p+L·M−1 of the uplink bandwidth part being overlapped with a last OFDM symbol of the slot p of the downlink bandwidth part, so that K1 corresponding to the sub-slot (L·M)·p+L·M−1 of the uplink bandwidth part is equal to 0, and a granularity of K1 is a sub-slot, or, for one PDSCH of the slot p of the downlink bandwidth part, a last OFDM symbol of the PDSCH being located in the sub-slot n of the uplink bandwidth part, so that K1 corresponding to the sub-slot of the uplink bandwidth part is equal to 0, and a granularity of K1 is a sub-slot, or, for one PDSCH of the slot p of the downlink bandwidth part, a last OFDM symbol of a slot M·p+M−1 of the uplink bandwidth part being overlapped with a last OFDM symbol of the slot p of the downlink bandwidth part, so that K1 corresponding to the sub-slot M·p+M−1 of the uplink bandwidth part is equal to 0, and a granularity of K1 is a slot, or, for one PDSCH of the slot p of the downlink bandwidth part, a last OFDM symbol of the PDSCH being located in a slot r of the uplink bandwidth part, so that K1 corresponding to the slot of the uplink bandwidth part is equal to 0, and a granularity of K1 is a slot.

In accordance with an aspect of the disclosure, a user equipment is provided. The user equipment includes a receiving unit, configured to receive a physical Downlink Shared Channel (PDSCH), a Physical Uplink Control Channel (PUCCH) resource determination unit, configured to determine PUCCH resources for feeding back Hybrid Automatic repeat Request Acknowledgement (HARQ-ACK) information of the PDSCH, and a transmission unit, configured to transmit a HARQ-ACK of the PDSCH on the PUCCH resources according to at least one of HARQ-ACK timing information, the time domain duration of scheduling unit a downlink bandwidth part and an uplink bandwidth part, and PUCCH resource indication information.

In accordance with another aspect of the disclosure, a user equipment is provided. The user equipment includes a processing unit, and a storage unit, configured to store machine readable instructions, which, when executed by the processing unit, configure the processing unit to perform the method according to the first aspect.

In accordance with another aspect of the disclosure, a computer readable storage medium having stored thereon executable instructions which, when executed by a processor, cause the processor to perform the method according to the first aspect.

With the embodiments of the application, transmission of HARQ-ACKs is effectively supported in a case that HARQ-ACK information of multiple carriers needs to be fed back by determining the HARQ-ACK codebook for feeding back the PDSCH.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
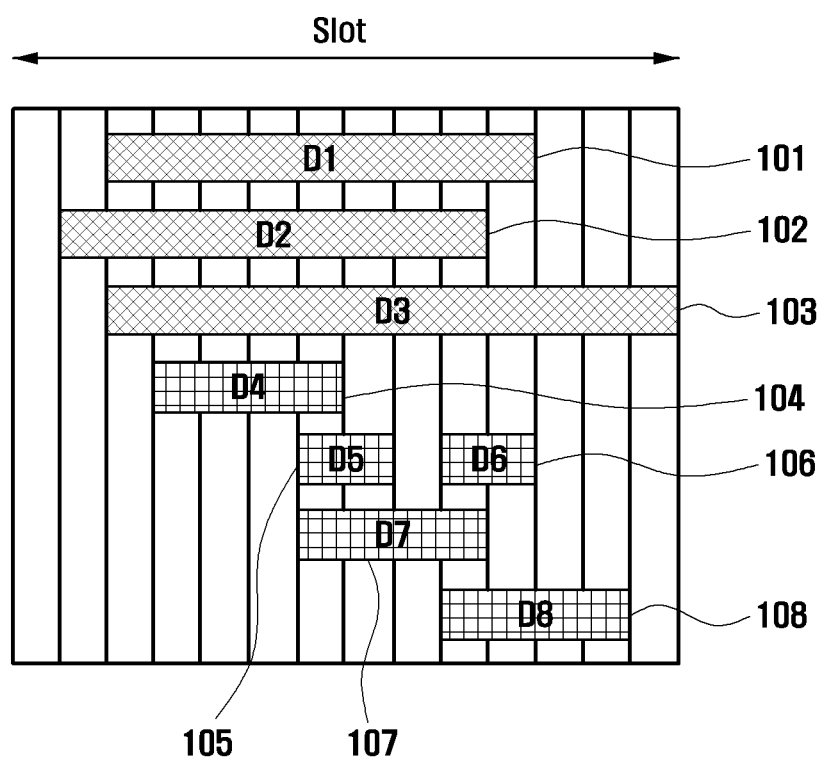
FIG. 1 illustrates a schematic diagram of one possible configuration of Physical Downlink Shared Channel (PDSCH) time resources according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It can be understood by those skilled in the art that all terms (comprising technical and scientific terms) used here have the same meaning as commonly understood by those of ordinary skill in the art to which the application belongs, unless otherwise defined. It should also be understood that terms such as those defined in a general dictionary should be understood to have meaning consistent with the meaning in the context of the related art, and will not be explained as an idealized or excessively formal meaning unless specifically defined as here.

It can be understood by those skilled in the art that the "terminal" and "terminal device" used here comprise not only a wireless signal receiver device, which has only a wireless signal receiver without a transmitting capability, but also comprise a receiving and transmitting hardware device which is capable of two-way communication over a two-way communication link. Such a device may comprise a cellular or other communication device which may comprise a single line display or a multi-line display or may not comprise a multi-line display, a Personal Communication Service (PCS), which may comprise voice, data processing, fax, and/or data communication capabilities; a Personal Digital Assistant (PDA), which may comprise a radio frequency receiver, a pager, Internet/Intranet access, a web browser, a notepad, a calendar, and/or a Global Positioning System (GPS) receiver, and a laptop and/or palmtop computer or other device having and/or comprising a radio frequency receiver. The "terminal" and "terminal device" used here may be portable, transportable, installed in transportations (aviation transportations, sea transportations and/or land transportations), or adapted and/or configured to operate locally, and/or operate in any other location on the earth and/or space in a distributed form. The "terminal" and "terminal device" used here may also be communication terminals, internet terminals, or music/video playing terminals, for example, PDAs, Mobile Internet Devices (MIDs), and/or mobile phones having music/video playback functions, or may also be devices such as smart TVs, set-top boxes etc.

Downlink transmission refers to transmitting a signal from a base station to a User Equipment (UE). Downlink signals comprise a data signal, a control signal, and a reference signal (pilot). Here, the base station transmits downlink data in a Physical Downlink Shared Channel (PDSCH) or transmits downlink control information in a downlink control channel. Uplink transmission refers to transmitting a signal from a user equipment to a base station. Uplink signals also comprise a data signal, a control signal, and a reference signal. Here, the UE transmits uplink data in a Physical Uplink Shared Channel (PUSCH) or transmits uplink control information in a Physical Uplink Control Channel (PUCCH). The base station may dynamically schedule transmission of the PDSCH and transmission of the PUSCH of the UE through a Physical Downlink Control Channel (PDCCH). The uplink control information carried on the PUCCH may be classified into multiple types of information, comprising Hybrid Automatic Repeat Request (HARQ) Acknowledgement information (HARQ-ACK), Channel State Indication information (CSI), and Scheduling Request (SR) etc.

In a 5G system, one slot may be divided into at most three parts, i.e., a DL part, a Flexible part, and a UL part, which are referred to as a slot pattern hereinafter. The DL part may comprise ND OFDM symbols for downlink transmission, wherein ND is greater than or equal to 0, the UL part may comprise NU OFDM symbols for uplink transmission, wherein NU is greater than or equal to 0, the Flexible part may comprise NK OFDM symbols, wherein NK is greater than or equal to 0, and the Flexible part represents an unknown part, that is, it is not determined whether the Flexible part is used for uplink transmission or downlink transmission. In order to determine a slot pattern, one or more of the following indication methods at four levels may be used.

A first level: a semi-statically configured slot pattern, which may be a common pattern of cells or a group of UEs. For example, a pattern of each slot in one period is configured with Np slots as a period.

A second level: a semi-statically configured slot pattern, which may be a pattern configured separately for each UE. For example, a pattern of each slot in one period is configured with Np slots as a period.

A third level: a dynamically indicated slot pattern, which may be a common pattern of cells or a group of UEs, for example, a common PDCCH is used. For example, a pattern of each slot in one period is configured with Np slots as a period, or, a pattern of only one or more of Np slots in one period is configured, and slots which are not dynamically configured may be determined according to other information, for example, a semi-statically configured slot pattern.

A fourth level: a dynamically indicated slot pattern, wherein the pattern may be determined according to a PDCCH which schedules uplink transmission and downlink transmission of a UE. For example, an OFDM symbol which dynamically schedules the downlink transmission belongs to the DL part, and an OFDM symbol which dynamically schedules the uplink transmission belongs to the UL part.

When there is inconsistency in slot patterns indicated by the above indication methods at four levels, priorities for overloading may be defined.

In the 5G system, for downlink data transmission, latency between a PDCCH and a PDSCH which is scheduled by the PDCCH is K0, wherein K0 is greater than or equal to 0. Latency between the PDSCH and HARQ-ACK transmission corresponding to the PDSCH is K1, wherein K1 is greater than or equal to 0. For example, the above latencies K0 and K1 may be in units of slots. In the 5G system, a DL BWP where the PDSCH is located may have a slot length different from that of an UL BWP where the PUCCH is located. In the PDCCH which schedules the PDSCH, K1 may be set in units of the slot length of the UL BWP where the PUCCH is located.

In one slot, a start OFDM symbol and a number of symbols of a PDSCH of a UE which is scheduled by a base station may have one or more changes.

FIG. 1 illustrates a schematic diagram of one possible configuration of PDSCH time resources according to an embodiment of the disclosure.

Referring to FIG. 1, eight possible PDSCH resources 101, 102, 103, 104, 105, 106, 107, and 108 may be configured, and the PDSCH resources may have different start OFDM symbols and/or different numbers of OFDM symbols. In addition, the base station further supports allocation of one PDSCH in N slots. For example, the PDSCH may have the same time-frequency resources in consecutive N slots. The above parameter K0, the start OFDM symbol, the number of symbols or the parameter K1 may be separately configured and indicated, or may be jointly configured and indicated. In one slot, the base station may transmit multiple PDSCHs, and thus HARQ-ACK information of all the PDSCHs needs to be fed back. In order to flexibly utilize various spectrum resources, 5G still supports carrier aggregation. That is, the base station may configure multiple carriers for one UE, and correspondingly need to feed back HARQ-ACK information of the multiple carriers.

How to effectively support HARQ-ACK transmission, especially how to support using multiple PUCCHs or PUSCHs within one slot to carry HARQ-ACKs of the different PDSCHs, is a new problem to be solved.

It should be illustrated that although the technical solutions described below are mainly described for the 5G system, an application scenario thereof is not limited to a 5G communication system, but may be applied to any existing communication system or any communication system to be developed which needs to support using multiple PUCCHs or PUSCHs within one slot to carry HARQ-ACKs of the different PDSCHs.

To this end, the embodiments of the application propose a method for transmitting uplink control information, particularly a Hybrid Automatic repeat Request Acknowledgement (HARQ-ACK) of the uplink control information.

Figure 2:
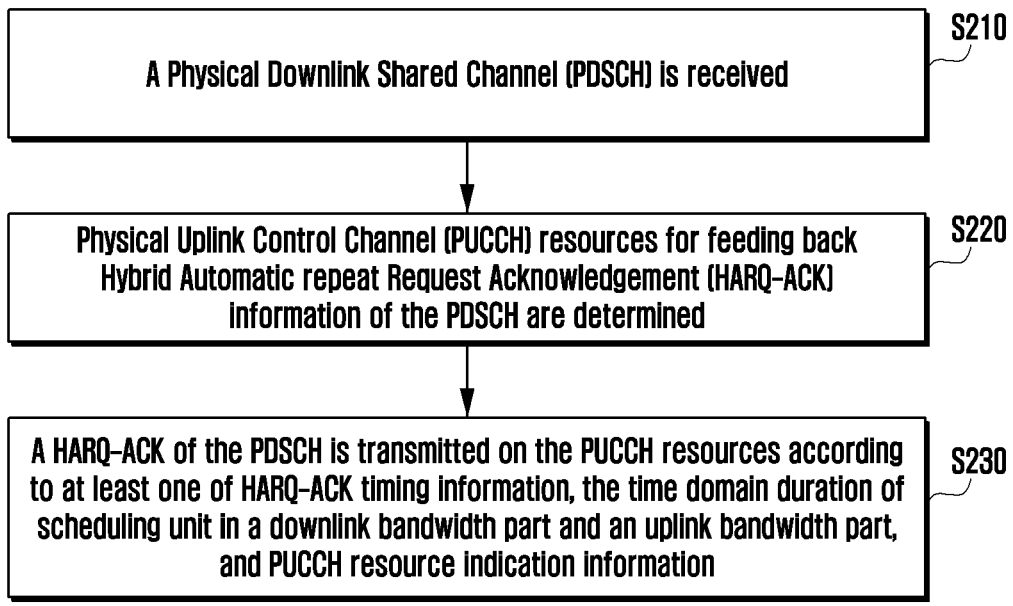
FIG. 2 is a schematic flowchart of a method for transmitting uplink control information according to an embodiment of the disclosure.

FIG. 2 is a schematic flowchart of a method for transmitting uplink control information according to an embodiment of the disclosure.

Referring to FIG. 2, the method comprises the following operations.

In operation S210, a Physical Downlink Shared Channel (PDSCH) is received.

In operation S220, Physical Uplink Control Channel (PUCCH) resources for feeding back Hybrid Automatic repeat Request Acknowledgement (HARQ-ACK) information of the PDSCH are determined.

In operation S230, a HARQ-ACK of the PDSCH is transmitted on the PUCCH resources according to at least one of HARQ-ACK timing information, the time domain duration of scheduling unit in a downlink bandwidth part and an uplink bandwidth part, and PUCCH resource indication information.

In some embodiments, transmitting a HARQ-ACK of the PDSCH on the PUCCH resources according to at least one of HARQ-ACK timing information, the time domain duration of scheduling unit in a downlink bandwidth part and an uplink bandwidth part, and PUCCH resource indication information may comprise determining, based on the HARQ-ACK feedback timing, a downlink slot set associated with HARQ-ACK locations in a HARQ-ACK codebook, determining, for each downlink slot in the slot set, a location of a HARQ-ACK corresponding to each candidate PDSCH reception in the HARQ-ACK codebook, and transmitting the HARQ-ACK on the PUCCH resources based on the determined HARQ-ACK codebook.

In some embodiments, when the uplink slot and the downlink slot have the same slot length, the HARQ-ACK feedback timing comprises transmitting, in a sub-slot n of the uplink bandwidth part, a corresponding HARQ-ACK of a PDSCH transmitted in a slot p of the downlink bandwidth part, wherein mod (n−K1−L+1, L)=0, where K1 is a latency between the PDSCH and the corresponding HARQ-ACK, a granularity of K1 is a sub-slot of the uplink bandwidth part, and L is a number of sub-slots in one slot in the uplink bandwidth part, and determining, based on the HARQ-ACK feedback timing, a downlink slot set associated with HARQ-ACK locations in a HARQ-ACK codebook comprises for K1 in the set K, determining the slot set in the HARQ-ACK codebook which needs to be allocated HARQ-ACK locations to be {(n−K1−L+1)/(L)}, where K1∈K, and K1 used in the set K satisfies mod (n−K1−L+1, L)=0.

In some embodiments, when the uplink slot and the downlink slot have the same slot length, the HARQ-ACK feedback timing comprises transmitting, in a sub-slot n of the uplink bandwidth part, a corresponding HARQ-ACK of a PDSCH transmitted in a slot p of the downlink bandwidth part, wherein n=L·p+l+K1, where l∈{0, 1, . . . L−1}, a granularity of K1 is a sub-slot of the uplink bandwidth part, and L is a number of sub-slots in one slot in the uplink bandwidth part, and determining, based on the HARQ-ACK feedback timing, a downlink slot set associated with HARQ-ACK locations in a HARQ-ACK codebook comprises for each K1, determining the slot set in the HARQ-ACK codebook which needs to be allocated HARQ-ACK locations to be $K_D=\{floor((n-K1)/L)\}$, where K1∈K.

In some embodiments, when the uplink slot and the downlink slot have the same slot length, the HARQ-ACK feedback timing comprises transmitting, in a sub-slot n of the uplink bandwidth part, a corresponding HARQ-ACK of a PDSCH transmitted in a slot p of the downlink bandwidth part, wherein n=L·(p+K1)+l, where l∈{0, 1, . . . L−1}, a granularity of K1 is a slot of the uplink bandwidth part, and L is a number of sub-slots in one slot in the uplink bandwidth part, determining, based on the HARQ-ACK feedback timing, a downlink slot set associated with HARQ-ACK locations in a HARQ-ACK codebook comprises, for each K1, determining the slot set in the HARQ-ACK codebook which needs to be allocated HARQ-ACK locations to be KD={r−K1}, where K1∈K, and r is an uplink slot corresponding to the HARQ-ACK to be transmitted, and the method further comprises determining, based on time resource information for determining the PUCCH resources, which sub-slot in the slot r the PUCCH for transmitting the HARQ-ACK is located in.

In some embodiments, when the uplink slot and the downlink slot have different slot lengths, the HARQ-ACK feedback timing comprises transmitting, in a sub-slot n of the uplink bandwidth part, a corresponding HARQ-ACK of a PDSCH transmitted in a slot p of the downlink bandwidth part, wherein mod ((n−K1−M*L+1), M*L)=0, where K1 is a latency between the PDSCH and the corresponding HARQ-ACK, a granularity of K1 is a sub-slot of the uplink bandwidth part, L is a number of sub-slots in one slot in the uplink bandwidth part, and M is a ratio of a length of a downlink slot to a length of an uplink slot, and determining, based on the HARQ-ACK feedback timing, a downlink slot set associated with HARQ-ACK locations in a HARQ-ACK codebook comprises for K1 in the set K, determining the slot set in the HARQ-ACK codebook which needs to be allocated HARQ-ACK locations to comprise KD={(n−K1−M*L+1)/(M*L)}, where K1∈K, and K1 used in the set K satisfies mod ((n−K1−M*L+1), M*L)=0.

In some embodiments, when the uplink slot and the downlink slot have different slot lengths, the HARQ-ACK feedback timing comprises transmitting, in a sub-slot n of the uplink bandwidth part, a corresponding HARQ-ACK of a PDSCH transmitted in a slot p of the downlink bandwidth part, wherein n=floor (L·M)·p+l+K1, where l∈{0, 1, . . . L·M−1}, a granularity of K1 is a sub-slot of the uplink bandwidth part, L is a number of sub-slots in one slot in the uplink bandwidth part, and M is a ratio of a length of a downlink slot to a length of an uplink slot, and determining, based on the HARQ-ACK feedback timing, a downlink slot set associated with HARQ-ACK locations in a HARQ-ACK codebook comprises, for each K1, determining the slot set in the HARQ-ACK codebook which needs to be allocated HARQ-ACK locations to be KD={floor ((n−K1)/L/M)}, where K1∈K.

In some embodiments, when the uplink slot and the downlink slot have different slot lengths, the HARQ-ACK feedback timing comprises transmitting, in a sub-slot n of the uplink bandwidth part, a corresponding HARQ-ACK of a PDSCH transmitted in a slot p of the downlink bandwidth part, wherein n=L·((M·p)+K1)+1, where l∈ {0, 1, . . . L·M−1}, a granularity of K1 is a slot of the uplink bandwidth part, L is a number of sub-slots in one slot in the uplink bandwidth part, and M is a ratio of a length of a downlink slot to a length of an uplink slot, and determining, based on the HARQ-ACK feedback timing, a downlink slot set associated with HARQ-ACK locations in a HARQ-ACK codebook comprises, for each K1, determining the slot set in the HARQ-ACK codebook which needs to be allocated HARQ-ACK locations to be:

KD=(r−K1)/M+m, if M≤1, where m=0,1, . . . 1/M−1;
and

KD={floor (r−K1)/M} or KD={(r−K1−M+1)/M}, if M>1, where a granularity of K1 is a slot of the uplink bandwidth part, and K1∈K, and the method further comprises determining, based on time resource information for determining the PUCCH resources, which sub-slot n in the slot r the PUCCH for transmitting the HARQ-ACK is located in, wherein r is an uplink slot corresponding to the HARQ-ACK to be transmitted.

In some embodiments, determining, for each downlink slot in the slot set, a location of a HARQ-ACK corresponding to each candidate PDSCH reception in the HARQ-ACK codebook comprises determining, for each downlink slot kd in the slot set, a location of a HARQ-ACK corresponding to one or more PDSCHs in a downlink slot kd.

In some embodiments, determining a location of a HARQ-ACK corresponding to one or more PDSCHs in the downlink slot kd comprises allocating, for the downlink slot kd, a HARQ-ACK location to a PDSCH having a last Orthogonal Frequency Division Multiplexing (OFDM) symbol located in an uplink sub-slot (L·M)·kd+q according to slots or sub-slots of the uplink bandwidth part, no matter whether there is K1 in the set K of K1 which satisfies slot (L·M)·kd+q+K1=n, where 0≤q<L·M, or allocating, for the downlink slot kd, a HARQ-ACK location to a PDSCH having a last OFDM symbol located in an uplink sub-slot (L·M)·kd+q, only when it is determined that there is K1 in the set K of K1 which satisfies (L·M)·kd+q+K1=n, where 0≤q<L·M, and n is an uplink sub-slot for transmitting a HARQ-ACK.

In some embodiments, determining a location of a HARQ-ACK corresponding to one or more PDSCHs in the downlink slot kd further comprises determining that the HARQ-ACK codebook does not comprise a HARQ-ACK location of a PDSCH for which the end location of its last OFDM symbol is located behind an uplink sub-slot n, or the HARQ-ACK codebook does not comprise a HARQ-ACK location of a PDSCH for which the end location of its last OFDM symbol is not in the front of a start point of the uplink sub-slot n.

In some embodiments, the HARQ-ACK feedback timing comprises for one PDSCH of a slot p of the downlink bandwidth part, a last OFDM symbol of a sub-slot L·p+L−1 of the uplink bandwidth part being overlapped with a last OFDM symbol of the slot p of the downlink bandwidth part, so that K1 corresponding to the sub-slot L·p+L−1 of the uplink bandwidth part is equal to 0, or, for one PDSCH of the slot p of the downlink bandwidth part, a last OFDM symbol of the PDSCH being located in a sub-slot n=L·p+l of the uplink bandwidth part, so that K1 corresponding to the sub-slot n of the uplink bandwidth part is equal to 0.

In some embodiments, the HARQ-ACK feedback timing comprises, for one PDSCH of a slot p of the downlink bandwidth part, a last OFDM symbol of a sub-slot (L·M) p+L·M−1 of the uplink bandwidth part being overlapped with a last OFDM symbol of the slot p of the downlink bandwidth part, so that K1 corresponding to the sub-slot (L·M)·p+L·M−1 of the uplink bandwidth part is equal to 0, and a granularity of K1 is a sub-slot, or, for one PDSCH of the slot p of the downlink bandwidth part, a last OFDM symbol of the PDSCH being located in the sub-slot n of the uplink bandwidth part, so that K1 corresponding to the sub-slot of the uplink bandwidth part is equal to 0, and a granularity of K1 is a sub-slot, or, for one PDSCH of the slot p of the downlink bandwidth part, a last OFDM symbol of a slot M p+M−1 of the uplink bandwidth part being overlapped with a last OFDM symbol of the slot p of the downlink bandwidth part, so that K1 corresponding to the sub-slot M·p+M−1 of the uplink bandwidth part is equal to 0, and a granularity of K1 is a slot, or, for one PDSCH of the slot p of the downlink bandwidth part, a last OFDM symbol of the PDSCH being located in a slot r of the uplink bandwidth part, so that K1 corresponding to the slot of the uplink bandwidth part is equal to 0, and a granularity of K1 is a slot.

In the embodiments described above, the UE may further receive a Physical Downlink Control Channel (PDCCH). The base station may indicate scheduling information of a PDSCH through the PDCCH, for example, time frequency resources, a timing K1 of a HARQ-ACK, resource information (PRIs) of a PUCCH etc. Of course, it should be illustrated that it is also possible to transmit the scheduling information of the PDSCH through other control signaling/transmission channels.

To this end, the embodiments of the application propose a user equipment.

Figure 3:
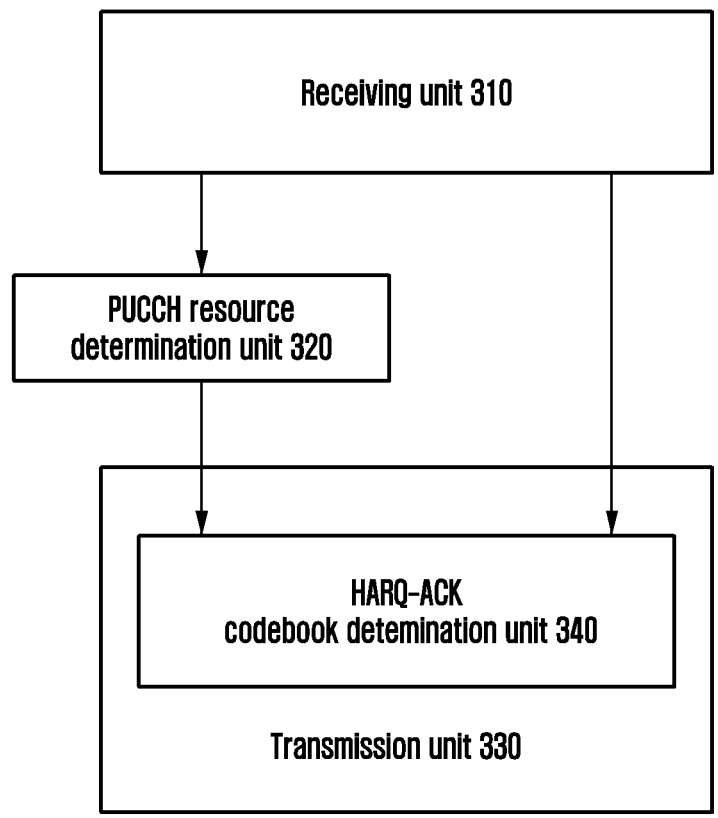
FIG. 3 illustrates a schematic block diagram of a User Equipment (UE) according to an embodiment of the disclosure.

FIG. 3 illustrates a schematic block diagram of a User Equipment (UE) according to an embodiment of the disclosure.

Referring to FIG. 3, the user equipment comprises a receiving unit 310, a PUCCH resource determination unit 320 and a transmission unit 330. The receiving unit 310 is configured to receive a Physical Downlink Shared Channel (PDSCH). The PUCCH resource determination unit 320 is configured to determine Physical Uplink Control Channel (PUCCH) resources for feeding back Hybrid Automatic repeat Request Acknowledgement (HARQ-ACK) information of the PDSCH. The transmission unit 330 is configured to transmit a HARQ-ACK of the PDSCH on the PUCCH resources according to at least one of HARQ-ACK timing information, the time domain duration of scheduling unit in a downlink bandwidth part and an uplink bandwidth part, and PUCCH resource indication information.

In some embodiments, the transmission unit 330 may comprise a HARQ-ACK codebook determination unit 340. Of course, the HARQ-ACK codebook determination unit 340 may also be a unit outside the transmission unit 330, which is not limited in the application. The HARQ-ACK codebook determination unit 340 may be configured to determine, based on the HARQ-ACK feedback timing, a downlink slot set associated with HARQ-ACK locations in a HARQ-ACK codebook, and determine, for each downlink slot in the slot set, a location of a HARQ-ACK corresponding to each candidate PDSCH reception in the HARQ-ACK codebook. The transmission unit 330 may be configured to transmit the HARQ-ACK on the PUCCH resources based on the determined HARQ-ACK codebook.

In some embodiments, when the uplink slot and the downlink slot have the same slot length, the HARQ-ACK feedback timing comprises transmitting, in a sub-slot n of the uplink bandwidth part, a corresponding HARQ-ACK of a PDSCH transmitted in a slot p of the downlink bandwidth part, wherein mod (n−K1−L+1, L)=0, where K1 is a latency between the PDSCH and the corresponding HARQ-ACK, a granularity of K1 is a sub-slot of the uplink bandwidth part, and L is a number of sub-slots in one slot in the uplink bandwidth part, and the HARQ-ACK codebook determination unit 340 may be configured to determine, for K1 in the set K, the slot set in the HARQ-ACK codebook which needs to be allocated HARQ-ACK locations to be {(n−K1−L+1)/(L)}, where K1∈K, and K1 used in the set K satisfies mod (n−K1−L+1,L)=0.

In some embodiments, when the uplink slot and the downlink slot have the same slot length, the HARQ-ACK feedback timing comprises transmitting, in a sub-slot n of the uplink bandwidth part, a corresponding HARQ-ACK of a PDSCH transmitted in a slot p of the downlink bandwidth part, wherein n=L·p+/+K1, where l∈{0, 1, . . . L−1}, a granularity of K1 is a sub-slot of the uplink bandwidth part, and L is a number of sub-slots in one slot in the uplink bandwidth part, and the HARQ-ACK codebook determination unit 340 may be configured to determine, for each K1, the slot set in the HARQ-ACK codebook which needs to be allocated HARQ-ACK locations to be KD={floor ((n−K1)/L)}, where K1∈K.

In some embodiments, when the uplink slot and the downlink slot have the same slot length, the HARQ-ACK feedback timing comprises transmitting, in a sub-slot n of the uplink bandwidth part, a corresponding HARQ-ACK of a PDSCH transmitted in a slot p of the downlink bandwidth part, wherein n=L·(p+K1)+1, where l∈ {0, 1, . . . L−1}, a granularity of K1 is a slot of the uplink bandwidth part, and L is a number of sub-slots in one slot in the uplink bandwidth part, the HARQ-ACK codebook determination unit 340 may be configured to determine, for each K1, the slot set in the HARQ-ACK codebook which needs to be allocated HARQ-ACK locations to be KD={r−K1}, where K1∈K, and r is an uplink slot corresponding to the HARQ-ACK to be transmitted, and the HARQ-ACK codebook determination unit 340 may further be configured to determine, based on time resource information for determining the PUCCH resources, which sub-slot in the slot r the PUCCH for transmitting the HARQ-ACK is located in.

In some embodiments, when the uplink slot and the downlink slot have different slot lengths, the HARQ-ACK feedback timing comprises transmitting, in a sub-slot n of the uplink bandwidth part, a corresponding HARQ-ACK of a PDSCH transmitted in a slot p of the downlink bandwidth part, wherein mod ((n−K1−M*L+1), M*L)=0, where K1 is a latency between the PDSCH and the corresponding HARQ-ACK, a granularity of K1 is a sub-slot of the uplink bandwidth part, L is a number of sub-slots in one slot in the uplink bandwidth part, and M is a ratio of a length of a downlink slot to a length of an uplink slot, and the HARQ-ACK codebook determination unit 340 may be configured to determine, for K1 in the set K, the slot set in the HARQ-ACK codebook which needs to be allocated HARQ-ACK locations to comprise KD={(n−K1−M*L+1)/(M*L)}, where K1∈K, and K1 used in the set K satisfies mod ((n−K1−M*L+1), M*L)=0.

In some embodiments, when the uplink slot and the downlink slot have different slot lengths, the HARQ-ACK feedback timing comprises transmitting, in a sub-slot n of the uplink bandwidth part, a corresponding HARQ-ACK of a PDSCH transmitted in a slot p of the downlink bandwidth part, wherein n=floor (L·M)·p+l+K1, where l∈{0, 1, . . . L·M−1}, a granularity of K1 is a sub-slot of the uplink bandwidth part, L is a number of sub-slots in one slot in the uplink bandwidth part, and M is a ratio of a length of a downlink slot to a length of an uplink slot, and the HARQ-ACK codebook determination unit 340 may be configured to determine, for each K1, the slot set in the HARQ-ACK codebook which needs to be allocated HARQ-ACK locations to be KD={floor ((n−K1)/L/M)}, where K1∈K.

In some embodiments, when the uplink slot and the downlink slot have different slot lengths, the HARQ-ACK feedback timing comprises transmitting, in a sub-slot n of the uplink bandwidth part, a corresponding HARQ-ACK of a PDSCH transmitted in a slot p of the downlink bandwidth part, wherein n=L·((M·p)+K1)+1, where l∈ {0, 1, . . . L·M−1}, a granularity of K1 is a slot of the uplink bandwidth part, L is a number of sub-slots in one slot in the uplink bandwidth part, and M is a ratio of a length of a downlink slot to a length of an uplink slot, and the HARQ-ACK codebook determination unit 340 may be configured to determine, for each K1, the slot set in the HARQ-ACK codebook which needs to be allocated HARQ-ACK locations to be:

$$KD=(r-K1)/M+m, \text{ if } M\leq 1, \text{ where } m=0,1, \ldots 1/M-1;$$

and

KD={floor (r−K1)/M} or KD={(r−K1−M+1)/M}, if M>1, where a granularity of K1 is a slot of the uplink bandwidth part, and K1∈K, and the HARQ-ACK codebook determination unit 340 may further be configured to determine, based on time resource information for determining the PUCCH resources, which sub-slot n in the slot r the PUCCH for transmitting the HARQ-ACK is located in, wherein r is an uplink slot corresponding to the HARQ-ACK to be transmitted.

In some embodiments, the HARQ-ACK codebook determination unit 340 may be configured to determine, for each downlink slot kd in the slot set, a location of a HARQ-ACK corresponding to one or more PDSCHs in a downlink slot kd.

In some embodiments, the HARQ-ACK codebook determination unit 340 may be configured to allocate, for the downlink slot kd, a HARQ-ACK location to a PDSCH having a last Orthogonal Frequency Division Multiplexing (OFDM) symbol located in an uplink sub-slot (L·M)·kd+q according to slots or sub-slots of the uplink bandwidth part, no matter whether there is K1 in the set K of K1 which satisfies (L·M)·kd+q+K1=n, where 0≤q<L·M, or allocate, for the downlink slot kd, a HARQ-ACK location to a PDSCH having a last OFDM symbol located in an uplink sub-slot (L·M)·kd+q, only when it is determined that there is K1 in the set K of K1 which satisfies (L·M)·kd+q+K1=n, where 0≤q<L·M, and n is an uplink slot for transmitting a HARQ-ACK.

In some embodiments, determining a location of a HARQ-ACK corresponding to one or more PDSCHs in the downlink slot kd further comprises determining that the HARQ-ACK codebook does not comprise a HARQ-ACK location of a PDSCH for which the end location of its last OFDM symbol is located behind an uplink sub-slot n, or the HARQ-ACK codebook does not comprise a HARQ-ACK location of a PDSCH for which the end location of its last OFDM symbol is not in the front of a start point of the uplink sub-slot n.

In some embodiments, the HARQ-ACK feedback timing comprises, for one PDSCH of a slot p of the downlink bandwidth part, a last OFDM symbol of a sub-slot L·p+L−1 of the uplink bandwidth part being overlapped with a last OFDM symbol of the slot p of the downlink bandwidth part, so that K1 corresponding to the sub-slot L·p+L−1 of the uplink bandwidth part is equal to 0, or, for one PDSCH of the slot p of the downlink bandwidth part, a last OFDM symbol of the PDSCH being located in a sub-slot n=L p+l of the uplink bandwidth part, so that K1 corresponding to the sub-slot n of the uplink bandwidth part is equal to 0.

In some embodiments, the HARQ-ACK feedback timing comprises, for one PDSCH of a slot p of the downlink bandwidth part, a last OFDM symbol of a sub-slot (L·M) p+L·M−1 of the uplink bandwidth part being overlapped with a last OFDM symbol of the slot p of the downlink bandwidth part, so that K1 corresponding to the sub-slot (L·M)·p+L·M−1 of the uplink bandwidth part is equal to 0, and a granularity of K1 is a sub-slot, or, for one PDSCH of the slot p of the downlink bandwidth part, a last OFDM symbol of the PDSCH being located in the sub-slot n of the uplink bandwidth part, so that K1 corresponding to the sub-slot of the uplink bandwidth part is equal to 0, and a granularity of K1 is a sub-slot, or, for one PDSCH of the slot p of the downlink bandwidth part, a last OFDM symbol of a slot M p+M−1 of the uplink bandwidth part being overlapped with a last OFDM symbol of the slot p of the downlink bandwidth part, so that K1 corresponding to the sub-slot M·p+M−1 of the uplink bandwidth part is equal to 0, and a granularity of K1 is a slot, or, for one PDSCH of the slot p of the downlink bandwidth part, a last OFDM symbol of the PDSCH being located in a slot r of the uplink bandwidth part, so that K1 corresponding to the slot of the uplink bandwidth part is equal to 0, and a granularity of K1 is a slot.

In the embodiments described above, the UE may further receive a Physical Downlink Control Channel (PDCCH). The base station may indicate scheduling information of a PDSCH through the PDCCH, for example, time frequency resources, a timing K1 of a HARQ-ACK, resource information (PRIs) of a PUCCH etc. Of course, it should be illustrated that it is also possible to transmit the scheduling information of the PDSCH through other control signaling/transmission channels.

It should be illustrated that FIGS. 2 and 3 only illustrate schematic diagrams for the convenience of understanding the technical solutions of the application. The technical solutions of the application are not limited to the structures shown in FIGS. 2 and 3.

The technical solutions of the application will be described in detail below according to specific examples. It is to be understood that the following specific implementations are merely examples for implementing the technical solutions of the application, and should not be construed as limiting the technical solutions of the application.

Figure 4:
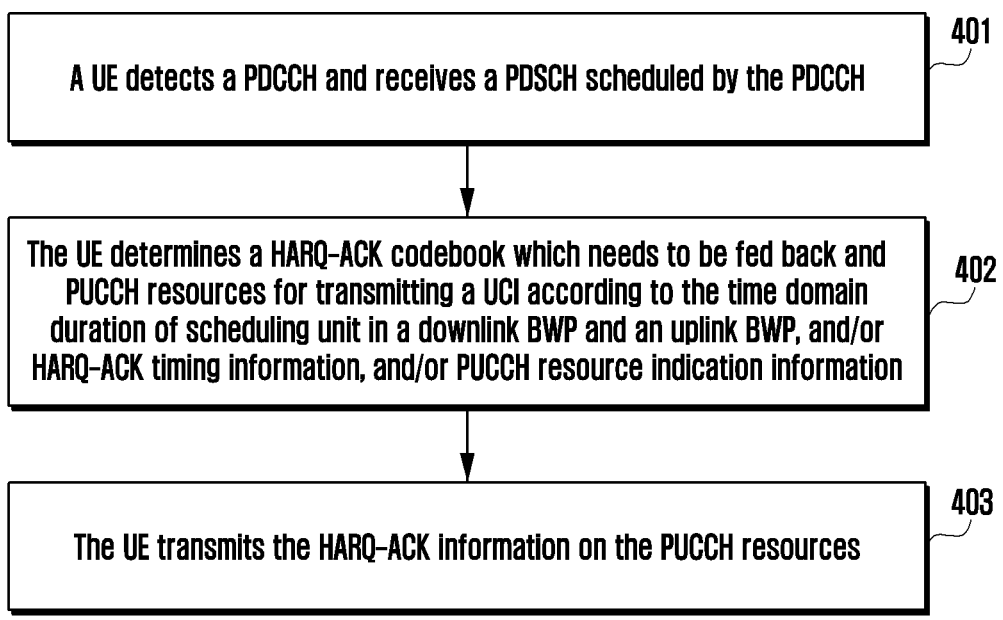
FIG. 4 is a schematic flowchart of a method for transmitting uplink control information according to an embodiment of the disclosure.

For downlink data transmission, in order to feed back uplink control information such as HARQ-ACKs etc., FIG. 4 illustrates a flowchart according to an embodiment of disclosure.

In operation 401, a UE detects a PDCCH and receives a PDSCH scheduled by the PDCCH.

In operation 402, the UE determines a HARQ-ACK codebook which needs to be fed back and PUCCH resources for transmitting a UCI according to the time domain duration of scheduling unit in a downlink BWP and an uplink BWP, and/or HARQ-ACK timing information, and/or PUCCH resource indication information.

Here, the time domain duration of scheduling unit in the downlink BWP is the length of a slot where the PDSCH is located, or a length of a sub-slot where the PDSCH is located, or a time resource length of a PDSCH group etc. The time domain duration of scheduling unit in the uplink BWP is the length of a slot where the PUSCH or PUCCH is located, or a length of a sub-slot where the PUSCH or PUCCH is located, or a time resource length of a PUSCH/PUCCH group.

The HARQ-ACK timing information may be information of a time difference between a time resource where the PDSCH is located and a time resource where the PUCCH which carries a HARQ-ACK is located, for example, a time difference between an end location of a last symbol of the PDSCH and a start symbol of the PUCCH, or a time difference between an end location of a last symbol of the PDSCH and a start point of a slot or sub-slot where a start symbol of the PUCCH is located or a time resource of the PUCCH group, or a time difference between an end location of a slot or sub-slot where an end location of a last symbol of the PDSCH is located or a time resource of the PDSCH group and a start point of a slot or sub-slot where a start symbol of the PUCCH is located or a time resource of the PUCCH group etc. The HARQ-ACK timing information may be dynamically indicated by the PDCCH, or configured by higher level signaling, or determined according to a predefined rule.

In addition, the UE may further determine the HARQ-ACK information which needs to be fed back and the PUCCH resources for transmitting the UCI according to a start OFDM symbol of the PUCCH resources for feeding back the UCI, and/or a time resource of the PDSCH, and/or a processing latency of the UE.

In operation 403, the UE transmits the HARQ-ACK information on the PUCCH resources.

The method for transmitting uplink control information according to the disclosure will be described below in conjunction with the embodiments.

In one slot, multiple PUCCHs may be transmitted in a TDM manner, and all the multiple PUCCHs may carry HARQ-ACKs. In a typical scenario, one PUCCH is used to feed back a HARQ-ACK for an enhanced Mobile Broad-Band service (eMBB), and the HARQ-ACK which is carried by the PUCCH may be derived from a PDSCH which is scheduled within a long time window so that a HARQ-ACK thereof is fed back on the PUCCH. Another PUCCH is used to feed back a HARQ-ACK for Ultra Reliable &Low Latency Communication (URLLC). For the PUCCH for the URLLC, because of low latency requirements, a HARQ-ACK which is fed back by the PUCCH is generally only derived from a PDSCH which is scheduled within a short time window so that a HARQ-ACK thereof is fed back on the PUCCH. In particular, only one PDSCH is scheduled within the short time window so that a HARQ-ACK thereof is fed back on the PUCCH. In another typical scenario, multiple PUCCHs are transmitted in one uplink slot. In order to ensure a low latency or a low code rate, HARQ-ACKs of multiple PDSCHs for the URLLC service are sequentially transmitted on various PUCCHs.

In operation 402, in order to determine the HARQ-ACK codebook, it needs to determine which PDSCHs have HARQ-ACKs corresponding to one PUCCH and determine which one of the PUCCHs the PUCCH is, especially when multiple PUCCHs are included in one uplink slot. In one implementation, a PDCCH which schedules one PDSCH may indicate a PUCCH for feeding back a HARQ-ACK of the PDSCH. For example, X-bit information may be added in a DCI format, to indicate 2' PUCCHs, for example, 1-bit information may be added in a DCI format, so that two PUCCHs in one uplink slot may be distinguished from each other. HARQ-ACKs of PDSCHs scheduled by all DCIs having the same 1-bit information are fed back in the same PUCCH. Alternatively, all values of PDSCH time domain resource assignment in the DCIs may be divided into X groups by using the PDSCH time domain resource assignment, and the same PUCCH is used for scheduling PDSCHs corresponding to each group of values. For example, a group of values indicates that a start symbol and/or a last symbol of each of PDSCHs in one slot has a relatively small index, and another group of values indicates that a start symbol and/or a last symbol of each of PDSCHs in one slot has a relatively large index. Alternatively, all values of PUCCH Resource Indications (PRIs) in the DCIs may be divided into X groups by using the PRIs, and the same PUCCH is used for scheduling PDSCHs corresponding to each group of values. Alternatively, a granularity of K1 may be defined as one sub-slot by using a HARQ-ACK timing K1 field in the DCI, and the same PUCCH is used for scheduling PDSCHs having the same indicated sub-slot. One uplink slot of the UL BWP is divided into L sub-slots in time, and PUCCH resources in one sub-slot belong to one PUCCH group. For example, one uplink slot is divided into L=two sub-slots, a first one of the sub-slots is first 7 symbols of the uplink slot, and a second one of the sub-slots is last 7 symbols of the uplink slot. L may be predefined according to a standard. For example, according to different sub-carrier intervals, L may be defined according to the standard separately, or one L may be uniformly defined. L may be configured using higher level signaling, such as RRC signaling, and the RRC signaling may be configured per UL BWP. L may also be dynamically indicated by, for example, a cell-specific DCI. An indication granularity of K1 is in units of sub-slots, for example, a set K1={0, 1, 2, 3} configured using the high level signaling represents 0/1/2/3 sub-slots. Alternatively, it may be determined which PDSCHs have HARQ-ACKs belonging to the same PUCCH according to a minimum processing latency of the UE and K1 with a slot as the granularity. A specific rule may be that, in the uplink slot determined according to K1, the UE transmits HARQ-ACKs only on a first PUCCH having a time interval between a last symbol of the PDSCH and a first symbol of the PUCCH greater than or equal to the minimum processing latency.

If the granularity of K1 may be a slot or a sub-slot, or another granularity, the granularity of K1 may be explicitly indicated using signaling. For example, in a case of a specific or configured DCI format or service type or RNTI, etc., the granularity of K1 is a sub-slot, and in other cases, the granularity of K1 is a slot. Alternatively, the granularity of K1 may also be implicitly indicated.

The method described above can be understood as grouping of PDSCHs, wherein PDSCHs in the same group correspond to the same PUCCH. PUCCH resources indicated by corresponding PRIs in a PDCCH which schedules the PDSCHs in the same group may be variable. For example, a group of PUCCH resources is determined according to a number of HARQ-ACK bits, which need to be fed back, of all PDSCHs in the same group which have been scheduled until now, one PUCCH resource in the group of PUCCH resources is indicated by a PRI, and thereby the PUCCH resources are related to the number of HARQ-ACK bits and the PRIs. This way of dynamically changing the PUCCH resources through the PRIs is commonly referred to as PUCCH resource rewriting.

The method described above may also be understood as grouping of PUCCHs. For multiple PDSCHs, if HARQ-ACK resources of the PDSCHs belong to the same PUCCH group, PUCCH resources in the same PUCCH group indicated by the PRIs of the PDCCH which schedules the PDSCHs may be considered to be variable. For example, the base station may carry all the HARQ-ACKs in the PUCCH group by indicating one PUCCH having more frequency domain resources (PRBs) in the PUCCH group using the PRI according to the number of the HARQ-ACK bits to be fed back in the same PUCCH group, that is, PUCCH resource rewriting.

For the PDSCH group or the PUCCH group, a group where the PDSCH or the PUCCH is located may be determined according to a start symbol of the PDSCH or the PUCCH, or the group where the PDSCH or the PUCCH is located may be determined according to an end location of a last symbol of the PDSCH or the PUCCH, or the group where the PDSCH or the PUCCH is located may be determined according to locations of the start symbol and the last symbol of the PDSCH or the PUCCH. In the last case, resources actually occupied by the PDSCH or the PUCCH are often defined not to span two groups.

The PUCCH group and the PDSCH group are only described from different perspectives, but have the same effect, i.e., determining which PUSCHs have HARQ-ACKs transmitted on one PUCCH and determining which one of the PUCCHs the PUCCH is. For convenience of description, the following description is simply made with reference to the PUCCH group.

In operation 402, after determining which PUSCHs have HARQ-ACKs transmitted on one PUCCH and determining which one of the PUCCHs the PUCCH is, it is also necessary to determine a number of HARQ-ACK bits transmitted on the PUCCH and an arrangement of the HARQ-ACK bits, that is, how to generate a HARQ-ACK codebook.

The HARQ-ACK codebook used by the UE to feed back the HARQ-ACK information may be semi-statically determined. For one carrier, all HARQ-ACK locations of this carrier may be determined according to a set K for configuring K1, a semi-static slot pattern, a configured PDCCH monitoring occasion, and/or a set T of configured PDSCH time resources. All HARQ-ACK locations in a case of CA may be obtained by cascading HARQ-ACK locations of multiple carriers. Each element of the above set T may indicate a start OFDM symbol S and a number Le of symbols of a possible PDSCH. Each element of the above set T may also indicate a scheduling latency K0. Each element of the above set T may also indicate a PDSCH type. For example, the set T may be determined according to possible PDSCH time resources of a currently activated BWP. The above set T is a set of time resources which may be indicated by the Time Domain Resource Assignment (TDRA) of the DCI. A start symbol offset S of a PDSCH is indicated in the TDRA. A symbol number of a start point of the PDSCH in one downlink time unit may be determined according to a predefined reference point and the indicated start symbol offset. For example, if the predefined reference point is a start point of a downlink slot, S indicated in the TDRA represents a symbol #S in one downlink slot. As another example, the predefined reference point is a start symbol of a PDCCH monitoring occasion, and it is assumed that a PDCCH monitoring occasion 1 is included in symbols #0~1 in one downlink slot, and a PDCCH monitoring occasion 2 is included in symbols #7~8 in the downlink slot. Then, for a PDSCH scheduled by the PDCCH in PDCCH monitoring occasion 1, S indicated in the TDRA indicates that a start symbol of the PDSCH is a symbol #S in one downlink slot, and for a PDSCH scheduled by the PDCCH monitoring occasion 2, S indicated in the TDRA indicates that a start symbol of the PDSCH is a symbol #(7+S) in one downlink slot. Then, a set (set T) of PDSCH time resources which may be scheduled in one downlink time unit is determined by a plurality of PDCCH monitoring occasions and the TDRA. For example, in one downlink slot, symbols #0~1, #4~5, and #7~8 each have one PDCCH monitoring occasion, and the TDRA has 4 rows which are S=0&L=4, S=0&L=7, S=2&L=4, and S=4&L=2 respectively. Then, the set T comprises twelve PDSCH time resources, which are S=0&L=4, S=0&L=7, S=2&L=4, S=4&L=2, S=4&L=4, S=4&L=7, S=6&L=4, S=8&L=2, S=7&L=4, S=7&L=7, S=9&L=4, and 8=11&L=2 respectively. In some scenarios, the predefined reference point corresponding to the start symbol offset indicated by some elements in the TDRA is different from the predefined reference point corresponding to the start symbol offset indicated by some other elements in the TDRA. For example, when the scheduling latency K0 of one element is equal to 0 (K0=0), the predefined reference point corresponding to the start symbol offset is the start symbol of a PDCCH monitoring occasion. When the scheduling latency K0 of one element is larger than 0 (K0>0), the predefined reference point corresponding to the start symbol offset is the start point of an uplink slot. Then the set (set T) of PDSCH time resources which may be scheduled in one downlink time unit can be jointly determined by the above described two methods, where this set can be used to determine a HARQ-ACK codebook. For example, in one downlink slot, symbols #0~1, #4~5, and #7~8 each have one PDCCH monitoring occasion, and the TDRA has 4 rows which are K0=0&S=0&L=4, K0=1&S=0&L=7, K0=1&S=2&L=4, and K0=1&S=4&L=2 respectively. Then, the set T comprises six PDSCH time resources, which are S=0&L=4, S=4&L=4, S=7&L=4, S=0&L=7, S=2&L=4, and S=4&L=2 respectively.

In some scenarios, a possible start location of the PDSCH may be determined according to the TDRA and other time information, in which case the set T is also determined according to the other time information. For example, a base station may indicate time resource information of one PDSCH through the TDRA, and indicate a start symbol of another PDSCH by indicating an offset Tsof with respect to a time resource of the PDSCH. By taking a semi-persistent scheduling PDSCH (SPS PDSCH) as an example, the base station may activate a plurality of SPS PDSCH configurations at the same time, wherein the base station indicates a start OFDM symbol and a number of symbols of a PDSCH of an SPS PDSCH configuration 1 through the TDRA. It is assumed that the start symbol is a symbol #2, the number of symbols is 4, and the base station indicates that the offset Tsof with respect to the time resource of this PDSCH is 7 symbols. Then, a start symbol of a PDSCH of an SPS PDSCH configuration 2 is a symbol #9, and a number of symbols of the SPS PDSCH configuration 2 is the same as that of the SPS PDSCH configuration 1. Then, possible PDSCH time resources in one downlink time unit included in the set T are determined not only by the TDRA but also by the offset Tsof. In some scenarios, the base station is configured and/or predefined with a plurality of TDRAs. If the plurality of TDRAs are likely to be used in one downlink time unit, the set T is a union of these TDRAs.

The HARQ-ACK codebook used by the UE to feed back the HARQ-ACK information may also be dynamically determined. All HARQ-ACK locations for all carriers may be determined according to an indicated K1, or a Downlink Assignment Indicator (DAI), such as a Counter-DAI (C-DAI), a Total-DAI (T-DAI), and/or a DAI in an UL grant (referred to as UL DAI).

In order to generate the HARQ-ACK codebook, a HARQ-ACK feedback timing may be determined according to one of the following methods, so as to determine a slot set KD on a corresponding DL BWP in the HARQ-ACK codebook which need to be allocated HARQ-ACK locations. The method for determining the HARQ-ACK feedback timing described below is applicable to both a semi-static codebook and a dynamic codebook, and determining the slot set KD based on the feedback timing method is only applicable to the semi-static codebook.

In a first method, for one PDSCH of a slot p of a DL BWP, a last OFDM symbol of a sub-slot L·p+L−1 of an UL BWP is overlapped with a last OFDM symbol of the slot p of the DL BWP, so that K1 corresponding to a sub-slot L·p+L−1 of the UL BWP is equal to 0. According to this method of defining a feedback timing, for a sub-slot n of the UL BWP, for one K1, only when a last OFDM symbol of a sub-slot n−K1 is overlapped with a last OFDM symbol of one slot of the DL BWP, that is, n−K1−L+1 is divisible by L, a HARQ-ACK of the PDSCH of this slot of the DL BWP is transmitted in the sub-slot n of the UL BWP according to the above K1.

Based on the above analysis, for a semi-static HARQ-ACK codebook, for one carrier, according to a set K of K1, only when n−K1−L+1 is divisible by L, that is, mod (n−K1−L+1, L)=0, a slot set KD on the DL BWP which needs to be allocated HARQ-ACK locations comprises a slot (n−K1−L+1)/L, where K1∈K and mod represents a modulo operation. The UE determines a HARQ-ACK location for each slot kd of the set KD.

Figure 5:
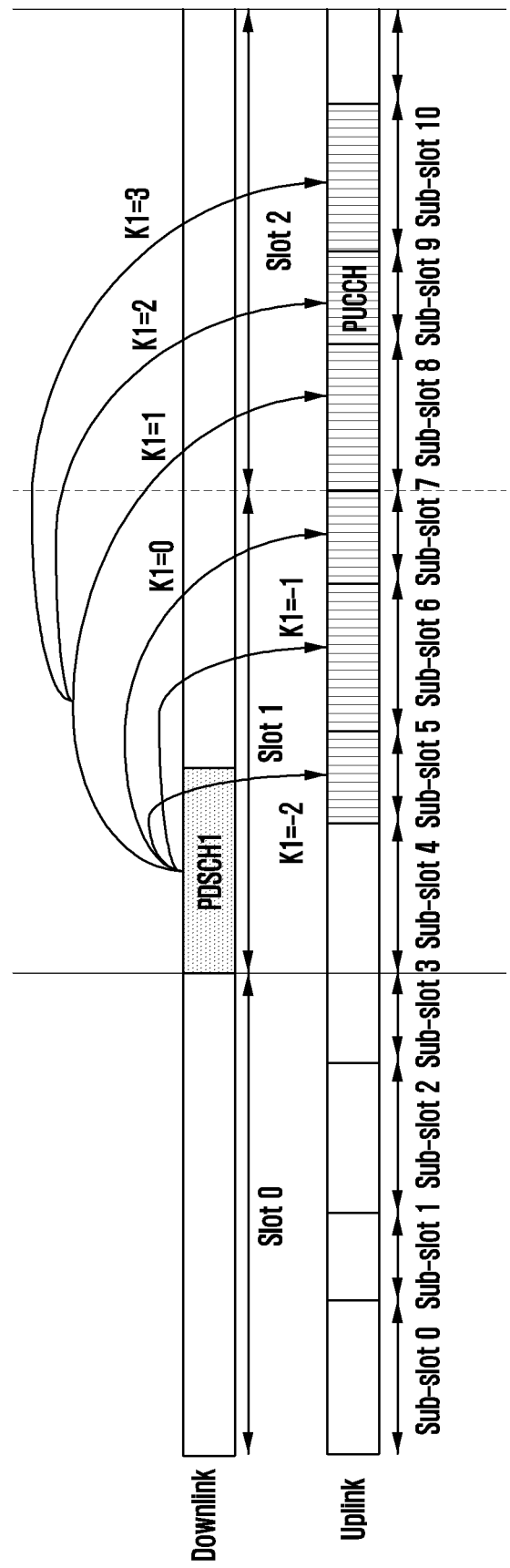
FIG. 5 illustrates an example of a first method for determining a slot set KD on a corresponding DL BWP in a HARQ-ACK codebook which needs to be allocated HARQ-ACK locations according to a HARQ-ACK feedback timing according to an embodiment of the disclosure.

FIG. 5 illustrates an example of a first method for determining a slot set KD on a corresponding DL BWP in a HARQ-ACK codebook which needs to be allocated HARQ-ACK locations according to a HARQ-ACK feedback timing according to an embodiment of the disclosure.

Referring to FIG. 5, one uplink slot is divided into L=four uplink sub-slots. An indication granularity of K1 is an uplink sub-slot, and a set K of K1 is {−2, −1, 0, 1, 2, 3}. It is assumed that PDSCH1 is transmitted in a downlink slot kd=1. A sub-slot of the UL BWP which is overlapped with a last OFDM symbol of a downlink slot 1 where a last symbol of the PDSCH1 is located is an uplink sub-slot 7. If a base station schedules the UE to transmit a HARQ-ACK of the PDSCH1 in an uplink sub-slot 5, the base station needs to indicate K1=−2 in a PDCCH which schedules the PDSCH1. If the base station schedules the UE to transmit the HARQ-ACK of the PDSCH1 in an uplink sub-slot 6, the base station needs to indicate K1=−1 in the PDCCH which schedules the PDSCH1. If the base station schedules the UE to transmit the HARQ-ACK of the PDSCH1 in the uplink sub-slot 7, the base station needs to indicate K1=0 in the PDCCH which schedules the PDSCH1. Similarly, if the base station schedules the UE to transmit the HARQ-ACK of the PDSCH1 in a PUCCH of an uplink sub-slot 10, the base station needs to indicate K1=3 in the PDCCH which schedules the PDSCH1. Assuming that the UE transmits the PUCCH in an uplink sub-slot n=9, then for the set K, only K1=−2 and K1=2 satisfy mod ((9−K1−4+1,)4)=0. That is, for the HARQ-ACK codebook transmitted in the PUCCH, for one carrier, K1 has only two values, i.e., K1=−2 or 2, and KD comprises two downlink slots, which are a downlink slot 1 (obtained according to (9−2−4+1)/4) and a downlink slot 2 (obtained according to (9+2−4+1)/4) respectively. In one downlink slot, the base station may transmit one or more PDSCHs. HARQ-ACK locations of this carrier are obtained by cascading HARQ-ACK locations of various slots of the set KD. All HARQ-ACK locations in a case of CA are obtained by cascading HARQ-ACK locations of multiple carriers.

It should be illustrated that although K1 may have a negative value, in general, the base station does not indicate K1 which enables the PUCCH resource to be in front of the PDSCH resource. As shown in FIG. 5, the base station does not indicate K1=−2 in the PDCCH which schedules PDSCH1.

In addition, it can be seen from this example that if the value of K1 may only be an integer greater than or equal to 0, a latency from PDSCH to PUCCH may be too large. In this case, the HARQ-ACK of the PDSCH1 as shown may only be transmitted in the PUCCH in the sub-slot 7 at the earliest, and may not be transmitted in the sub-slot 6, even if there is sufficient processing time.

In a second method, according to sub-slots of an UL BWP, for a value of K1, for PUCCH resources of a sub-slot n of the UL BWP, only when an end location of a last OFDM symbol of a scheduled PDSCH on a DL BWP is located in a sub-slot n−K1, a PDCCH which schedules the PDSCH indicates the PUCCH resources of the sub-slot n of the UL BWP by setting K1. One slot p of the DL BWP corresponds to a sub-slot L·p+l on the UL BWP, where l=0, 1, . . . L−1. Correspondingly, L different values of K1 are required to indicate the PUCCH resources of the sub-slot n of the UL BWP in the PDCCH. More generally, a corresponding HARQ-ACK of a PDSCH transmitted in a slot p of a downlink bandwidth part is transmitted in a sub-slot n of an uplink bandwidth part, wherein n=L·p+l+K1, where l∈{0, 1, . . . L−1}.

Based on the above analysis, for a semi-static HARQ-ACK codebook, for one carrier, according to a set K of K1, a downlink slot set on the DL BWP which needs to be allocated HARQ-ACK locations is KD={floor ((n−K1)/L)}, where K1∈K. Here, different values of K1 may correspond to slots on the same DL BWP. The UE determines a HARQ-ACK location for each slot kd of the set KD.

Figure 6:
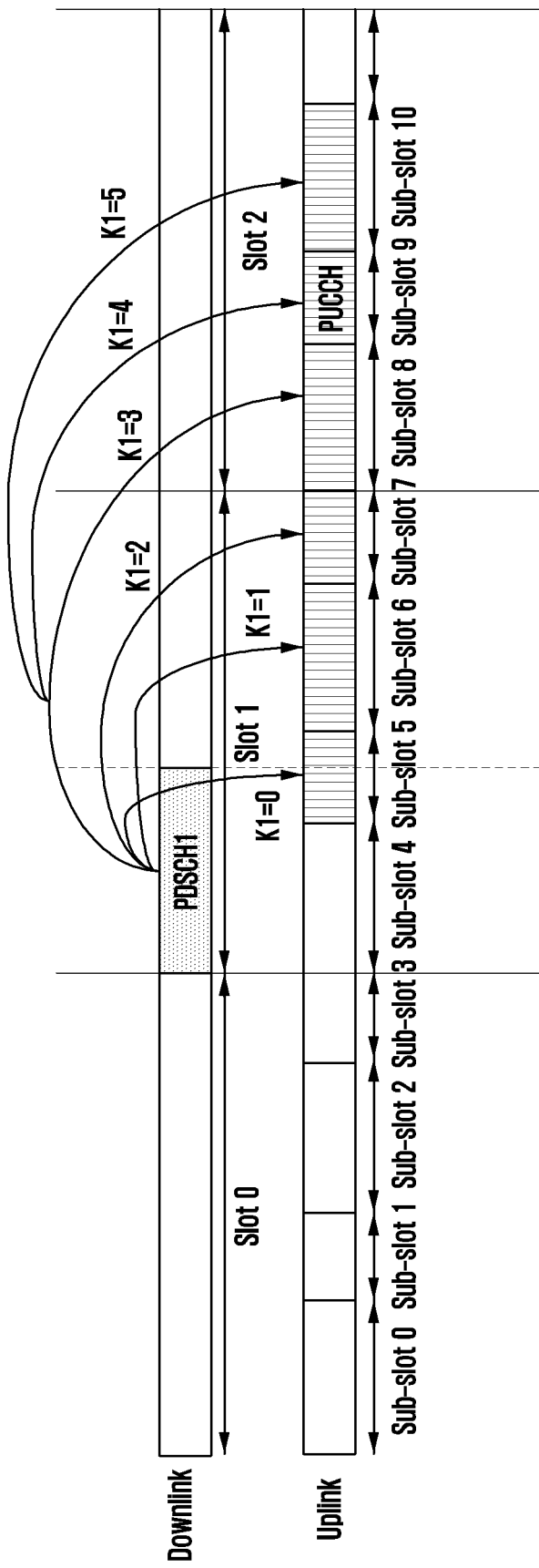
FIG. 6 illustrates an example of a second method for determining a slot set KD on a corresponding DL BWP in a HARQ-ACK codebook which needs to be allocated HARQ-ACK locations according to a HARQ-ACK feedback timing according to an embodiment of the disclosure.

FIG. 6 illustrates an example of a second method for determining a slot set KD on a corresponding DL BWP in a HARQ-ACK codebook which needs to be allocated HARQ-ACK locations according to a HARQ-ACK feedback timing according to an embodiment of the disclosure.

Referring to FIG. 6, one uplink slot is divided into L=four uplink sub-slots. An indication granularity of K1 is an uplink sub-slot, and a set K of K1 is {0, 1, 2, 3, 4, 5}. It is assumed that PDSCH1 is transmitted in a downlink slot kd=1. When an end location of a last symbol of the PDSCH1 is located in an uplink sub-slot n−K1, a sub-slot of the UL BWP is an uplink sub-slot 5. If a base station schedules the UE to transmit a HARQ-ACK of the PDSCH1 in the uplink sub-slot 5, the base station needs to indicate K1=0 in a PDCCH which schedules the PDSCH1. If the base station schedules the UE to transmit the HARQ-ACK of the PDSCH1 in an uplink sub-slot 6, the base station needs to indicate K1=1 in the PDCCH which schedules the PDSCH1. Similarly, if the base station schedules the UE to transmit the HARQ-ACK of the PDSCH1 in a PUCCH of an uplink sub-slot 10, the base station needs to indicate K1=5 in the PDCCH which schedules the PDSCH1. Assuming that the UE transmits the PUCCH in an uplink sub-slot n=9, for a HARQ-ACK codebook transmitted in the PUCCH, for one carrier, K1 may comprise all values, and KD comprises two downlink slots, which are a downlink slot 1 and a downlink slot 2 respectively that are obtained according to floor((9−K1)/4). HARQ-ACK locations of this carrier are obtained by cascading HARQ-ACK locations of various slots of the set KD. All HARQ-ACK locations in a case of CA are obtained by cascading HARQ-ACK locations of multiple carriers.

It can be seen from comparison between FIG. 6 and FIG. 5 that, with the method of FIG. 6, even if the value of K1 is only greater than or equal to 0, the HARQ-ACK of the PDSCH1 may be allowed to be transmitted in the PUCCH in the sub-slot 5 or the sub-slot 6 at the earliest in a case that there is sufficient processing time.

In a third method, for a value of K1, an uplink slot of one UL BWP is determined, and it is determined, according to indicated PUCCH resources, which sub-slot n in the uplink slot of the UL BWP the PUCCH is located in. For example, one uplink slot is divided into four uplink sub-slots. One slot p of the DL BWP corresponds to a sub-slot L·p+l on the UL BWP, where l=0, 1, . . . L−1. More generally, a corresponding HARQ-ACK of a PDSCH transmitted in a slot p of a downlink bandwidth part is transmitted in a sub-slot n of an uplink bandwidth part, wherein n=L·(p+K1)+l, where l∈ {0, 1, . . . L−1}. Correspondingly, only one value of K1 is required to indicate a slot r of the UL BWP in the PDCCH, and it is determined, in combination with time resource information of the PUCCH resources indicated by PRIs in a PDCCH, which sub-slot of the slot r the PUCCH is located in. As described above, a sub-slot number corresponding to the PUCCH may be determined according to which sub-slot a start symbol of the PUCCH is located in, or according to which sub-slot an end location of a last symbol of the PUCCH is located in, or according to which sub-slot the entire time resource of the PUCCH is located in.

Based on the above analysis, for a semi-static HARQ-ACK codebook, for one carrier, according to a set K of K1, a downlink slot set on the DL BWP which needs to be allocated HARQ-ACK locations is KD={r−K1}, where K1∈K. The UE determines a HARQ-ACK location for each slot kd of the set KD.

Figure 7:
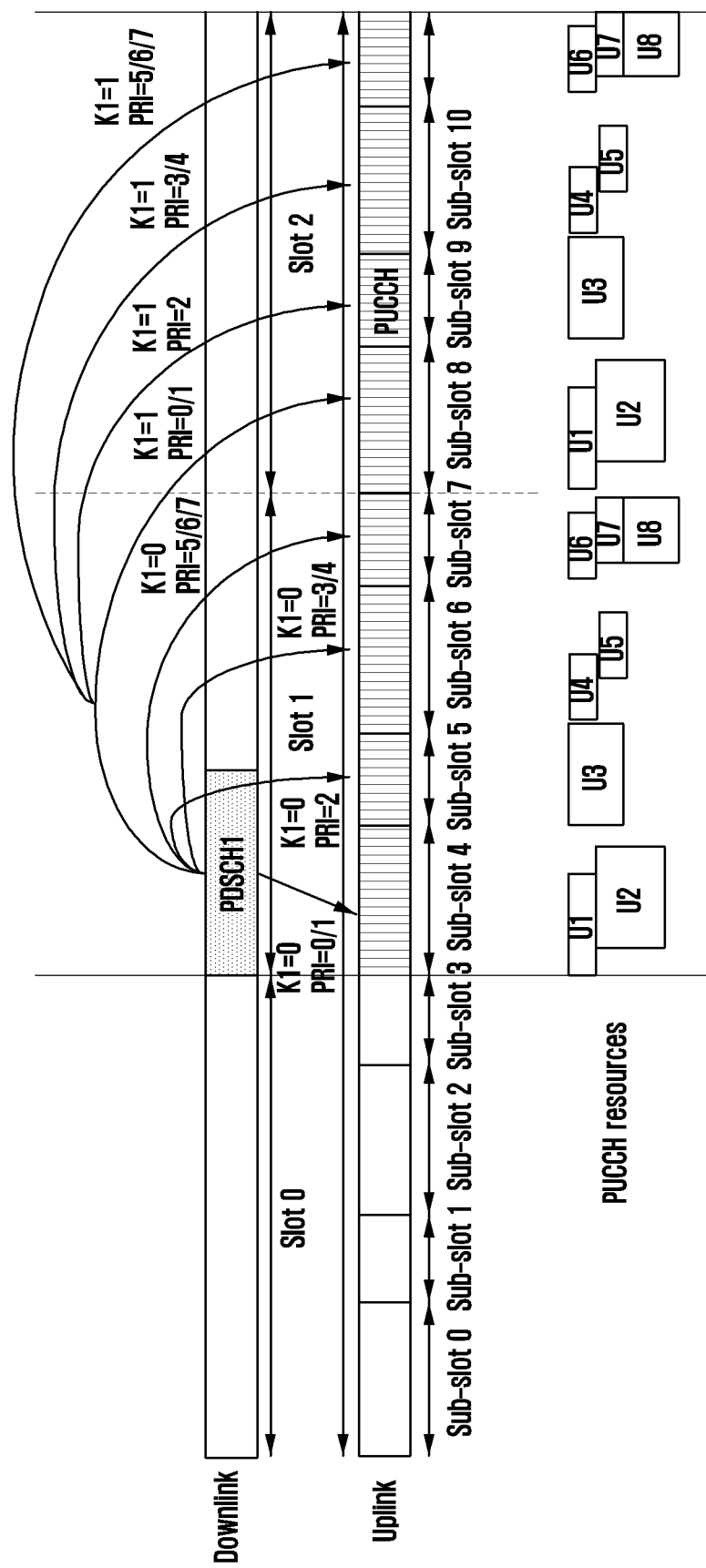
FIG. 7 illustrates an example of a third method for determining a slot set KD on a corresponding DL BWP in a HARQ-ACK codebook which needs to be allocated HARQ-ACK locations according to a HARQ-ACK feedback timing according to an embodiment of the disclosure.

FIG. 7 illustrates an example of a third method for determining a slot set KD on a corresponding DL BWP in a HARQ-ACK codebook which needs to be allocated HARQ-ACK locations according to a HARQ-ACK feedback timing according to an embodiment of the disclosure.

Referring to FIG. 7, one uplink slot is divided into L=four uplink sub-slots. It is assumed that a 3-bit PRI indicates 8 PUCCH resources in one uplink slot, as shown. Here, PRI='000' corresponds to U1, '001' corresponds to U2, . . . and '111' corresponds to U8. According to the sub-slot where the start symbol of the PUCCH is located, it is determined that U1/U2 belongs to a first uplink sub-slot in one uplink slot, U3 belongs to a second uplink sub-slot in one uplink slot, U4/U5 belongs to a third uplink sub-slot in one uplink slot, and U6/U7/U8 belongs to a fourth uplink sub-slot in one uplink slot. It is assumed that an indication granularity of K1 is an uplink sub-slot, and a set K of K1 is {0, 1}. It is assumed that PDSCH1 is transmitted in a downlink slot kd=1. When an end location of a last symbol of the PDSCH1 is located in an uplink sub-slot r−K1, a slot of the UL BWP is an uplink slot 1. If a base station schedules the UE to transmit a HARQ-ACK of the PDSCH1 in uplink sub-slots 4-7, the base station needs to indicate K1=0 in a PDCCH which schedules the PDSCH1. If the base station schedules the UE to transmit the HARQ-ACK of the PDSCH1 in uplink sub-slots 8-11, the base station needs to indicate K1=1 in the PDCCH which schedules the PDSCH1. Assuming that the UE transmits the PUCCH in an uplink sub-slot n=9, K1=1 and PRI='010' should be indicated in the PDCCH, and for a HARQ-ACK codebook transmitted in the PUCCH, for one carrier, K1 may comprise all values, and KD comprises two downlink slots, which are a downlink slot 1 and a downlink slot 2 respectively. HARQ-ACK locations of this carrier are obtained by cascading HARQ-ACK locations of various slots of the set KD. All HARQ-ACK locations in a case of CA are obtained by cascading HARQ-ACK locations of multiple carriers.

In a fourth method, for a value of K1, a start symbol of a PUCCH is determined and an uplink sub-slot n where the PUCCH is located is determined according to the start symbol of the PUCCH. For example, one uplink slot is divided into four uplink sub-slots. One slot p for a DL BWP corresponds to a sub-slot L·p+l on an UL BWP, where l=0, 1, . . . L−1. An indication granularity of K1 is an uplink symbol, and a set K of K1 is {5, 6, 7, 8, 9, 10, 11, 12} symbols. The start symbol of the PUCCH is determined according to the indication of K1 with an end boundary of the uplink sub-slot where a last symbol of the PDSCH is located as a reference. For example, if a last symbol of PDSCH1 in FIG. 7 is located in a sub-slot 5, a last symbol #6 of the sub-slot 5 is used as a reference, and K1=5 indicates that a start symbol of the PUCCH is a symbol #11, that is, a PUCCH resource U6, which is located in a sub-slot 6. As another example, K1=12 represents a symbol #6+12, i.e., a symbol #18 in a slot 2, that is, U3 in a sub-slot 9. Alternatively, the start symbol of the PUCCH is determined according to the indication of K1 with the last symbol of the PDSCH as a reference. For example, the last symbol of PDSCH1 in FIG. 7 is a symbol #5, and K1=6 indicates that the start symbol of the PUCCH is the symbol #11, that is, the PUCCH resource U6, which is located in the sub-slot 6. If the configured PUCCH resource comprises the start symbol information of the PUCCH, the start symbol of the PUCCH determined according to K1 is required to be consistent with the start symbol information of the PUCCH resource indicated by the PRI. Alternatively, the configured PUCCH resource does not comprise the start symbol information of the PUCCH, and the start symbol of the PUCCH is only determined according to K1. It is not difficult to see that for one PUCCH resource, a downlink slot set Kd is determined according to a start symbol s0 of the PUCCH resource and K1, that is, a downlink slot where a symbol $(s_0 - K1)$ is located.

For a semi-static HARQ-ACK codebook, there is a case that one slot r of one UL BWP may have a different length from that of one downlink slot p of a DL BWP, for example, when sub-carriers of the UL/DL BWP have different intervals, or cyclic prefixes of the UL/DL BWP have different lengths, the slots may have different lengths. In this case, an additional level is required to be added on the basis of the method for determining a HARQ-ACK feedback timing described above to determine the downlink slot set Kd. Assuming that the length of a slot of a DL BWP is M times the length of a slot of an UL BWP, a number of uplink sub-slots corresponding to one downlink slot is determined according to L*M. For example, assuming that the length of the slot of the UL BWP is twice the length of the slot of the DL BWP, that is, M=½, and one UL slot comprises four sub-slots, that is, L=4, then one downlink slot corresponds to two uplink sub-slots. As another example, assuming that the length of the slot of the UL BWP is ½ of the length of the slot of the DL BWP, that is, M=2, and one UL slot comprises two sub-slots, that is, L=2, then one downlink slot corresponds to four uplink sub-slots. Therefore, if a granularity of K1 is a sub-slot, according to the first method or the second method, the downlink slot set on the DL BWP which needs to be allocated HARQ-ACK locations is KD={(n−K1−M*L+1)/(M*L)}, or KD={floor ((n−K1)/L/M)} according to the set K of K1. If the granularity of K1 is a slot, according to the third method, the downlink slot set on the DL BWP which needs to be allocated HARQ-ACK locations is KD={(n−K1−M+1)/M} or KD={floor (n−K1)/M}.

Figure 8:
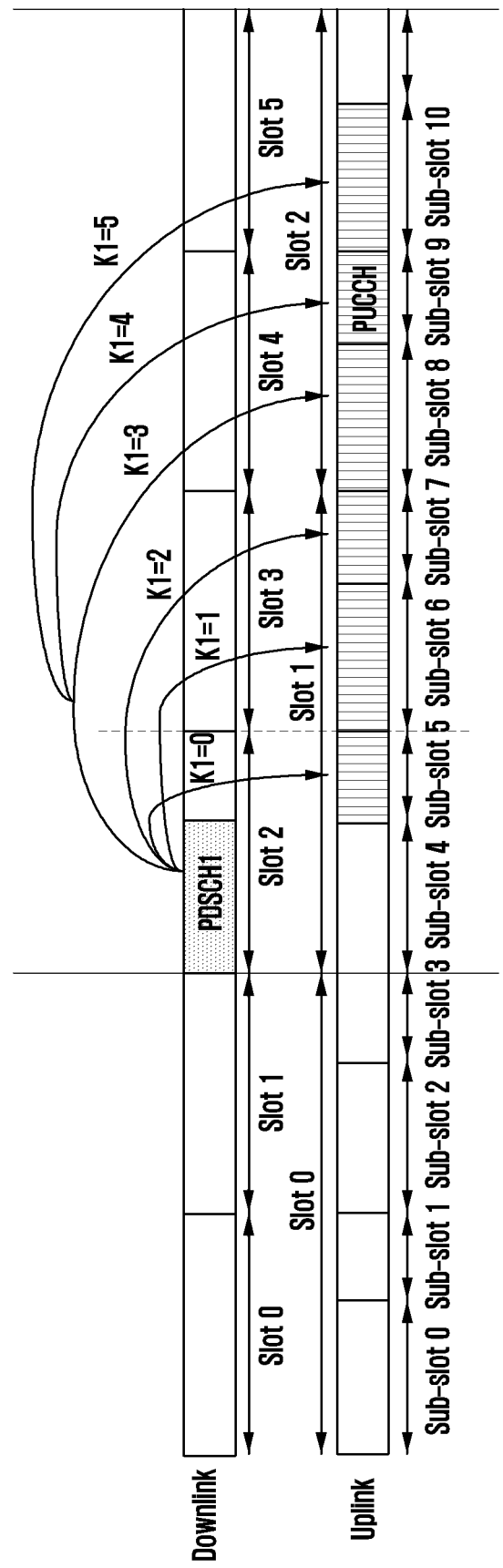
FIG. 8 illustrates an example of a first method for determining a slot set KD on a corresponding DL BWP in a HARQ-ACK codebook which needs to be allocated HARQ-ACK locations according to a HARQ-ACK feedback timing when DL/UL BWPs have different slot lengths according to an embodiment of the disclosure.

FIG. 8 illustrates an example of the first method according to an embodiment of the disclosure. Assuming that the length of a slot of an UL BWP is twice the length of a slot of a DL BWP, that is, M=½, and one UL slot comprises four sub-slots, that is, L=4, then one downlink slot corresponds to two uplink sub-slots. An indication granularity of K1 is an uplink sub-slot, and a set K of K1 is {0, 1, 2, 3, 4, 5}. It is assumed that PDSCH1 is transmitted in a downlink slot kd=2. A sub-slot of the UL BWP which is overlapped with a last OFDM symbol of a downlink slot 2 where a last symbol of the PDSCH1 is located is an uplink sub-slot 5. If a base station schedules the UE to transmit a HARQ-ACK of the PDSCH1 in an uplink sub-slot 5, the base station needs to indicate K1=0 in a PDCCH which schedules the PDSCH1. Similarly, if the base station schedules the UE to transmit the HARQ-ACK of the PDSCH1 in a PUCCH of an uplink sub-slot 10, the base station needs to indicate K1=5 in the PDCCH which schedules the PDSCH1. Assuming that the UE transmits the PUCCH in an uplink sub-slot n=9, then for the set K, only K1=0, K1=2 and K1=4 satisfy mod ((9−K1−2+1,)2)=0. That is, for the HARQ-ACK codebook transmitted in the PUCCH, for one carrier, K1 has only three values, i.e., K1=0, 2, or 4, and KD comprises three downlink slots, which are a downlink slot 2 (obtained according to (9−4−2+1)/2), a downlink slot 3 (obtained according to (9−2−2+1)/2) and a downlink slot 4 (obtained according to (9−0−2+1)/2) respectively. In one downlink slot, the base station may transmit one or more PDSCHs. HARQ-ACK locations of this carrier are obtained by cascading HARQ-ACK locations of various slots of the set KD. All HARQ-ACK locations in a case of CA are obtained by cascading HARQ-ACK locations of multiple carriers.

Figure 9:
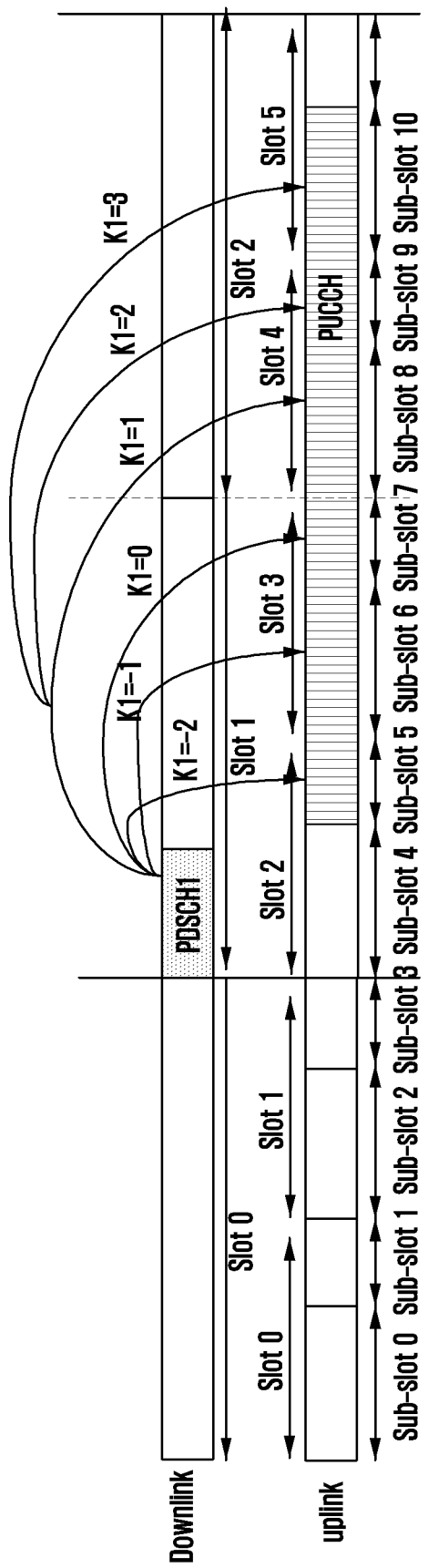
FIG. 9 illustrates another example of the first method for determining a slot set KD on a corresponding DL BWP in a HARQ-ACK codebook which needs to be allocated HARQ-ACK locations according to a HARQ-ACK feedback timing when DL/UL BWPs have different slot lengths according to an embodiment of the disclosure.

FIG. 9 illustrates another example of the first method according to an embodiment of the disclosure. Assuming that the length of a slot of an UL BWP is ½ of the length of a slot of a DL BWP, that is, M=2, and one UL slot comprises two sub-slots, that is, L=2, then one downlink slot corresponds to four uplink sub-slots. An indication granularity of K1 is an uplink sub-slot, and a set K of K1 is {−2, −1, 0, 1, 2, 3}. It is assumed that PDSCH1 is transmitted in a downlink slot kd=1. A sub-slot of the UL BWP which is overlapped with a last OFDM symbol of a downlink slot 1 where a last symbol of the PDSCH1 is located is an uplink sub-slot 7. If a base station schedules the UE to transmit a HARQ-ACK of the PDSCH1 in an uplink sub-slot 5, the base station needs to indicate K1=−2 in a PDCCH which schedules the PDSCH1. Similarly, if the base station schedules the UE to transmit the HARQ-ACK of the PDSCH1 in a PUCCH of an uplink sub-slot 10, the base station needs to indicate K1=3 in the PDCCH which schedules the PDSCH1. Assuming that the UE transmits the PUCCH in an uplink sub-slot n=9, then for the set K, only K1=−2 and K1=2 satisfy mod ((9−K1−4+1,)4)=0. That is, for the HARQ-ACK codebook transmitted in the PUCCH, for one carrier, K1 has only two values, i.e., K1=−2, and 2, and KD comprises two downlink slots, which are a downlink slot 2 (obtained according to (9+2−4+1)/4), and a downlink slot 1 (obtained according to (9−2−4+1)/4) respectively. In one downlink slot, the base station may transmit one or more PDSCHs. HARQ-ACK locations of this carrier are obtained by cascading HARQ-ACK locations of various slots of the set KD. All HARQ-ACK locations in a case of CA are obtained by cascading HARQ-ACK locations of multiple carriers.

Figure 10:
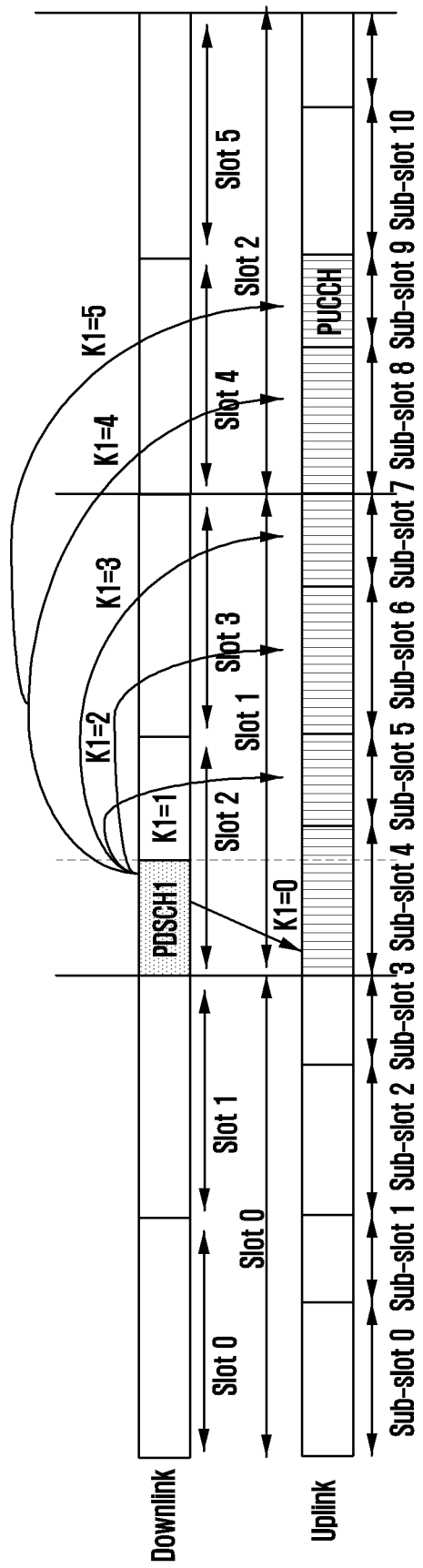
FIG. 10 illustrates an example of a second method for determining a slot set KD on a corresponding DL BWP in a HARQ-ACK codebook which needs to be allocated HARQ-ACK locations according to a HARQ-ACK feedback timing when DL/UL BWPs have different slot lengths according to an embodiment of the disclosure.

FIG. 10 illustrates an example of a second method according to an embodiment of the disclosure. Assuming that the length of a slot of an UL BWP is twice the length of a slot of a DL BWP, that is, M=½, and one UL slot comprises four sub-slots, that is, L=4, then one downlink slot corresponds to two uplink sub-slots. An indication granularity of K1 is an uplink sub-slot, and a set K of K1 is {0, 1, 2, 3, 4, 5}. It is assumed that PDSCH1 is transmitted in a downlink slot kd=2. When an end location of a last symbol of the PDSCH1 is located in an uplink sub-slot n−K1, a sub-slot of the UL BWP is an uplink sub-slot 4. If a base station schedules the UE to transmit a HARQ-ACK of the PDSCH1 in the uplink sub-slot 4, the base station needs to indicate K1=0 in a PDCCH which schedules the PDSCH1, and so on. Assuming that the UE transmits the PUCCH in an uplink sub-slot n=9, K1=5 is indicated in the PDCCH. For a HARQ-ACK codebook transmitted in the PUCCH, for one carrier, K1 may comprise all values, and KD comprises three downlink slots, which are downlink slots 2, 3, and 4 respectively that are obtained according to floor((9−K1)/2). HARQ-ACK locations of this carrier are obtained by cascading HARQ-ACK locations of various slots of the set KD. All HARQ-ACK locations in a case of CA are obtained by cascading HARQ-ACK locations of multiple carriers.

Figure 11A:
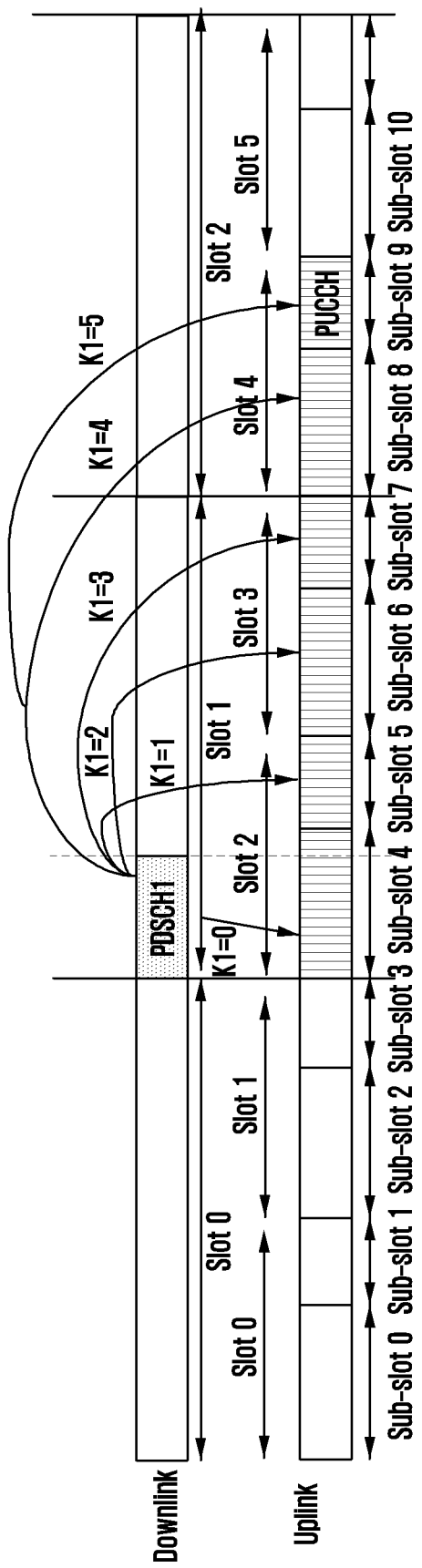
FIGS. 11A and 11B illustrate another example of the second method for determining a slot set KD on a corresponding DL BWP in a HARQ-ACK codebook which needs to be allocated HARQ-ACK locations according to a HARQ-ACK feedback timing when DL/UL BWPs have different slot lengths according to an embodiment of the disclosure.
Figure 11B:
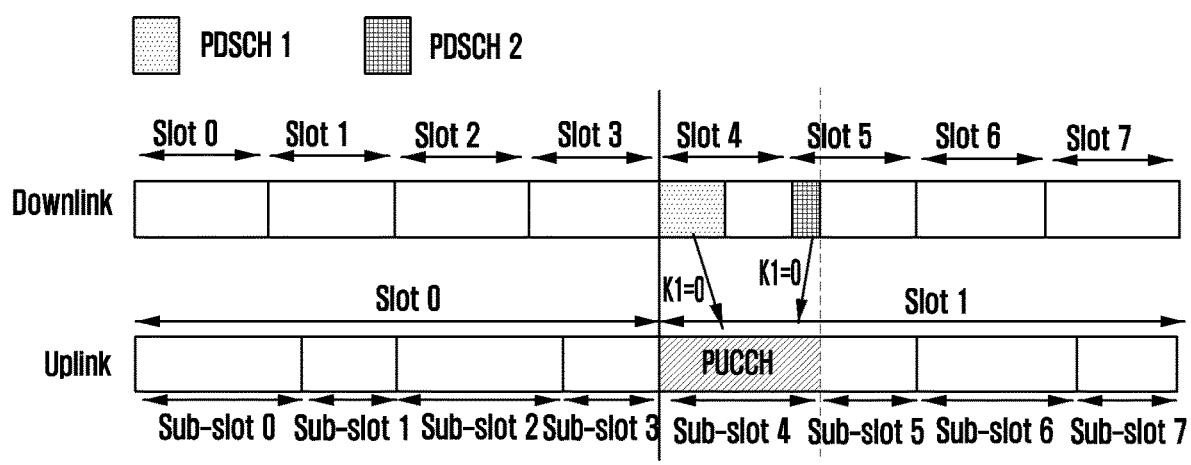

FIGS. 11A and 11B illustrate another example of the second method according to an embodiment of the disclosure. Assuming that the length of a slot of an UL BWP is ½ of the length of a slot of a DL BWP, that is, M=2, and one UL slot comprises two sub-slots, that is, L=2, then one downlink slot corresponds to four uplink sub-slots. An indication granularity of K1 is an uplink sub-slot, and a set K of K1 is {0, 1, 2, 3, 4, 5}. It is assumed that PDSCH1 is transmitted in a downlink slot kd=1. A sub-slot of the UL BWP where a last symbol of the PDSCH1 is located is an uplink sub-slot 4. If a base station schedules the UE to transmit a HARQ-ACK of the PDSCH1 in the uplink sub-slot 4, the base station needs to indicate K1=0 in a PDCCH which schedules the PDSCH1, and so on. Assuming that the UE transmits the PUCCH in an uplink sub-slot n=9, K1=5 is indicated in the PDCCH. For a HARQ-ACK codebook transmitted in the PUCCH, for one carrier, K1 may comprise all values, and KD comprises two downlink slots, which are downlink slots 1 and 2 respectively that are obtained according to floor((9−K1)/4). HARQ-ACK locations of this carrier are obtained by cascading HARQ-ACK locations of various slots of the set KD. All HARQ-ACK locations in a case of CA are obtained by cascading HARQ-ACK locations of multiple carriers.

Figure 12:
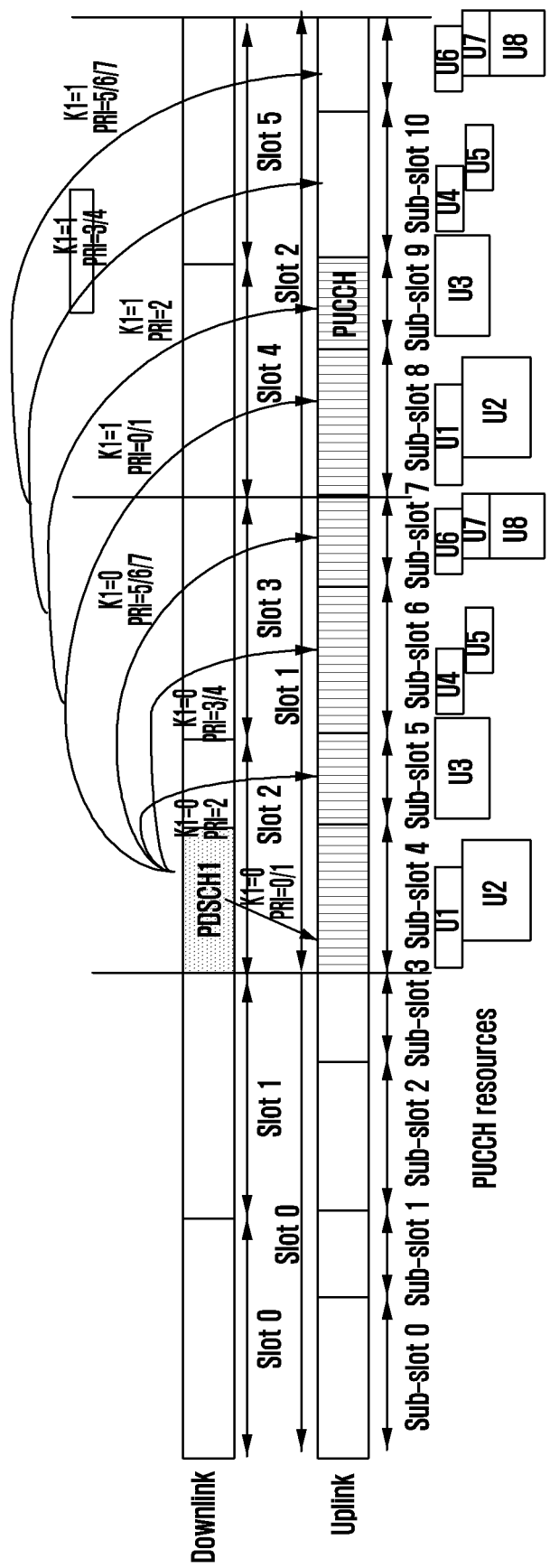
FIG. 12 illustrates an example of a third method for determining a slot set KD on a corresponding DL BWP in a HARQ-ACK codebook which needs to be allocated HARQ-ACK locations according to a HARQ-ACK feedback timing when DL/UL BWPs have different slot lengths according to an embodiment of the disclosure.

FIG. 12 illustrates an example of a third method according to an embodiment of the disclosure. Assuming that the length of a slot of an UL BWP is twice the length of a slot of a DL BWP, that is, M=½, and one UL slot comprises four sub-slots, that is, L=4, then one downlink slot corresponds to two uplink sub-slots. An indication granularity of K1 is an uplink slot, and a set K of K1 is {0, 1}. For a value of K1, an uplink slot r−K1 may overlap with $M_U$ downlink slots $M_U$−(r−K1)+m of the DL BWP, where m=0, 1, . . . $M_U$−1 and $M_U$=1/M. A PDSCH which schedules PDSCHs of these downlink slots indicates PUCCH resources of a slot r of the UL BWP by setting the value of K1. Based on the above analysis, for a semi-static HARQ-ACK codebook, for one carrier, according to a K1 of the set K for configuring K1, HARQ-ACK locations are determined and cascaded for various slots $M_U$−(r−K1)+m of the DL BWP, thereby obtaining all HARQ-ACK locations corresponding to the slot r and the value of K1 of the UL BWP. Assuming that the UE transmits the PUCCH in an uplink sub-slot n=9, K1=1 and PRI='010' should be indicated in the PDCCH. For a HARQ-ACK codebook transmitted in the PUCCH, for one carrier, K1 may comprise all values, and KD comprises four downlink slots, which are downlink slots 2-5. HARQ-ACK locations of this carrier are obtained by cascading HARQ-ACK locations of various slots of the set KD. All HARQ-ACK locations in a case of CA are obtained by cascading HARQ-ACK locations of multiple carriers. It is not difficult to see that it is impossible to feed back HARQ-ACKs of PDSCHs in the downlink slot 5 on the PUCCH of the sub-slot 9. It may be considered that the HARQ-ACK codebook does not comprise HARQ-ACK locations of the PDSCHs of the downlink slot 5 in the subsequent operations.

Figure 13:
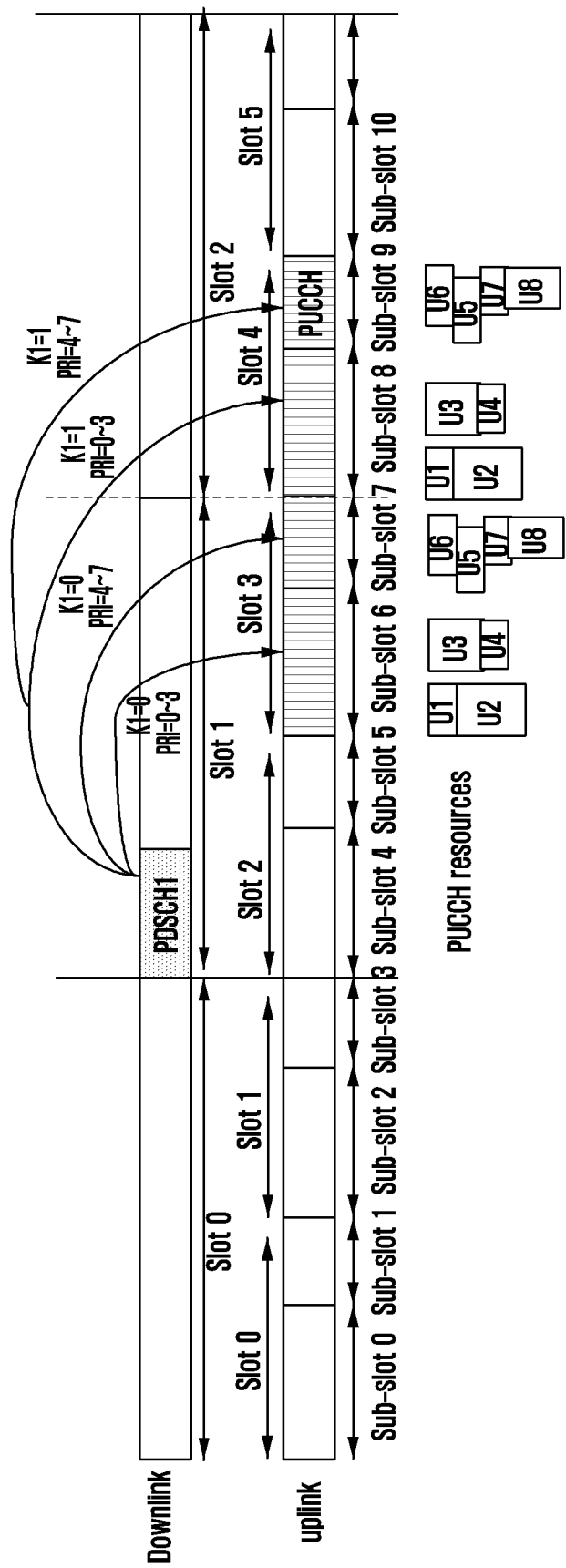
FIG. 13 illustrates another example of the third method for determining a slot set KD on a corresponding DL BWP in a HARQ-ACK codebook which needs to be allocated HARQ-ACK locations according to a HARQ-ACK feedback timing when DL/UL BWPs have different slot lengths according to an embodiment of the disclosure.

FIG. 13 illustrates another example of the third method according to an embodiment of the disclosure. Assuming that the length of a slot of an UL BWP is ½ of the length of a slot of a DL BWP, that is, M=2, and one UL slot comprises two sub-slots, that is, L=2, then one downlink slot corresponds to four uplink sub-slots. An indication granularity of K1 is an uplink slot, and a set K of K1 is {0, 1}. If an uplink slot of the UL BWP of K1=0 is determined according to a location of a last symbol of a downlink slot where a last symbol of a PDSCH is located, a slot of the UL BWP which is overlapped with a last OFDM symbol of a downlink slot 1 where a last symbol of a PDSCH1 is located is an uplink sub-slot 7 of an uplink slot 3. It is not difficult to see that as a result of this method, the UE cannot transmit the PUCCH in an uplink slot 2, and thus there is a large latency for a HARQ-ACK. Similarly, if a base station transmits the PDSCH in a downlink slot 2, the UE cannot transmit the PUCCH in an uplink slot 4. Assuming that the UE transmits the PUCCH in a location of U8 in a sub-slot n=9 of the uplink slot 4, K1=1 and PRI='111' should be indicated in the PDCCH. For a HARQ-ACK codebook transmitted in the PUCCH, for one carrier, a value of K1 must satisfy mod ((4−K1−2+1,)2)=0. Therefore, K1=1 and KD comprises one downlink slot, which is a downlink slot 1 (obtained according to (4−1−2+1)/2)). If the set K of K1 is {−1, 0, 1, 2}, K1 may have a value of −1 or 1, and KD comprises two downlink slots which are a downlink slot 1 and a downlink slot 2. HARQ-ACK locations of this carrier are obtained by cascading HARQ-ACK locations of various slots of the set KD. All HARQ-ACK locations in a case of CA are obtained by cascading HARQ-ACK locations of multiple carriers. It is not difficult to see that, in the downlink slot 2, if a last symbol of the PDSCH is behind the sub-slot 9 or is in the front of the sub-slot 9, it is impossible to feed back HARQ-ACKs on the PUCCH of the sub-slot 9. It may be considered that the HARQ-ACK codebook does not comprise HARQ-ACK locations of these PDSCHs in the subsequent operations.

Figure 14:
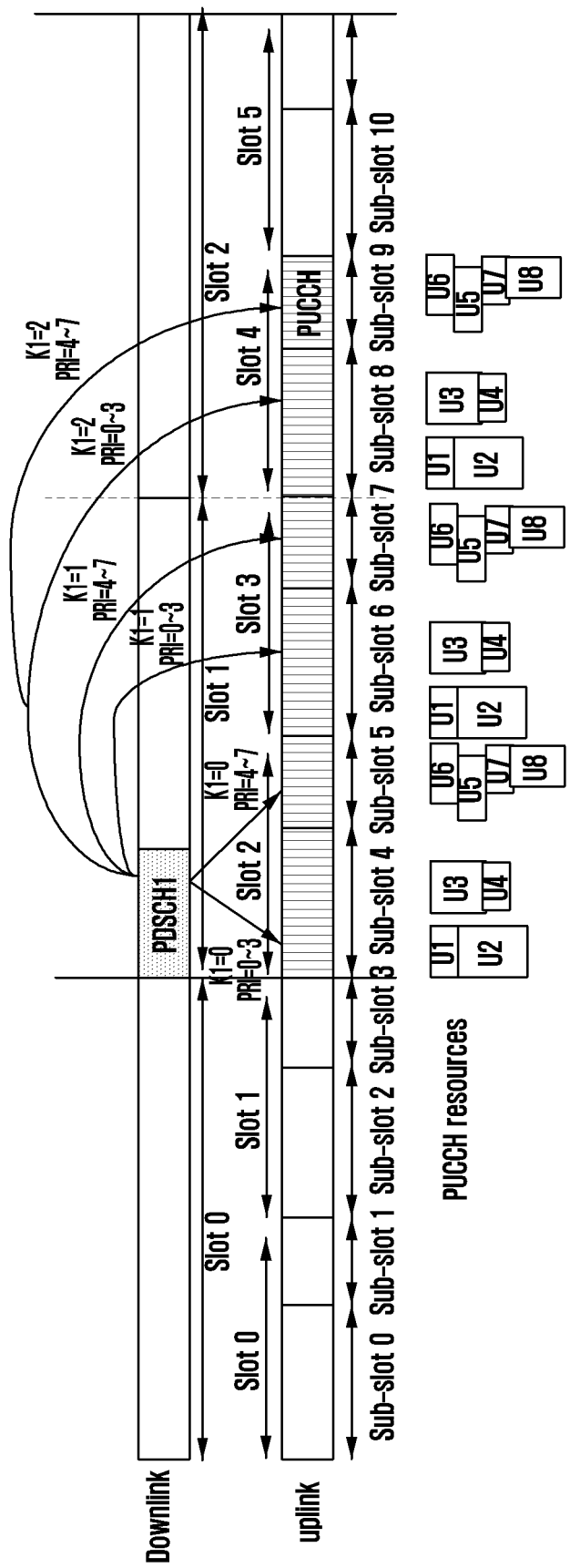
FIG. 14 illustrates a further example of the third method for determining a slot set KD on a corresponding DL BWP in a HARQ-ACK codebook which needs to be allocated HARQ-ACK locations according to a HARQ-ACK feedback timing when DL/UL BWPs have different slot lengths according to an embodiment of the disclosure.

FIG. 14 illustrates yet another example of the third method according to an embodiment of the disclosure. Assuming that the length of a slot of an UL BWP is ½ of the length of a slot of a DL BWP, that is, M=2, and one UL slot comprises two sub-slots, that is, L=2, then one downlink slot corresponds to four uplink sub-slots. An indication granularity of K1 is an uplink slot, and a set K of K1 is {0, 1, 2}. If an uplink slot of the UL BWP where an end location of a last symbol of a PDSCH is located is K1=0, a slot of the UL BWP where an end location of a last symbol of a PDSCH1 is located is an uplink sub-slot 4 of an uplink slot 2. Assuming that the UE transmits the PUCCH in a location of U8 in a sub-slot n=9 of the uplink slot 4, K1=2 and PRI='111' should be indicated in the PDCCH. For a HARQ-ACK codebook transmitted in the PUCCH, for one carrier, K1 may comprise all values, that is, K1=0/1/2, and KD comprises two downlink slots, which are downlink slot 1 and 2 (obtained according to (floor(4−K1)/2)). HARQ-ACK locations of this carrier are obtained by cascading HARQ-ACK locations of various slots of the set KD. All HARQ-ACK locations in a case of CA are obtained by cascading HARQ-ACK locations of multiple carriers.

In some special cases, one downlink slot may overlap with a plurality of uplink sub-slots, and a boundary of the downlink slot is not overlapped with boundaries of the uplink sub-slots. For example, a slot length of a UL BWP is four times a slot length of a DL BWP, that is, M=¼, and one UL slot comprises four sub-slots, that is, L=4, wherein first and third sub-slots each comprise four symbols, and second and fourth sub-slots each comprise three symbols. Then, in one UL slot, a first symbol of second and fourth downlink slots is overlapped with a last symbol of first and third uplink sub-slots, and a last symbol of the second and fourth downlink slots is overlapped with a last symbol of second and fourth uplink sub-slots. That is, the second and fourth downlink slots overlap with the first and second uplink sub-slots and the third and fourth uplink sub-slots respectively. In an extreme case, there may be one PDSCH in the second or fourth downlink slot, and an end boundary of a last symbol of this PDSCH is located in the first or third uplink sub-slot. As shown in FIG. 11B, a granularity of K1 is a sub-slot, and a set is {0, 1, 2, 3, 4, 5}. According to the second method, for a PUCCH of a sub-slot 4, K1 of PDSCH2 located in a slot 5 is equal to 0. Since a last symbol of PDSCH2 located in the slot 5 is located in the sub-slot 4, not only downlink slots 0-4 are determined for a downlink slot set corresponding to a HARQ-ACK of the PUCCH in the sub-slot 4 according to floor((4−K1)/(L*M))=4−K1, but also a downlink slot 5 is required to be included in the downlink slot set. If the PDSCH set determined according to the set T in the slot 5 has no last symbol in the slot 4, the downlink slot set does not comprise the downlink slot 5.

A set KD is determined using the method for determining a HARQ-ACK feedback timing described above, and HARQ-ACK locations corresponding to various candidate PDSCH receptions in a downlink slot kd in the set KD may be further determined according to one of the following methods.

In a first processing method, HARQ-ACK locations are determined and cascaded for various slots of the set KD of the DL BWP. A slot kd of the set KD corresponds to a sub-slot L·kd+l of the UL BWP, where l=0, 1, . . . L−1, and according to sub-slots of the UL BWP, HARQ-ACK locations are allocated to PDSCHs having a last OFDM symbol located in a sub-slot L·kd+q, where 0≤q<L. With this method, the HARQ-ACK locations of the corresponding PDSCHs may be determined regardless of whether a granularity of the K1 is a slot or a sub-slot. Further, in order to reduce overhead of the HARQ-ACK codebook, the HARQ-ACK codebook may not comprise a HARQ-ACK location of a PDSCH for which the end location of its last OFDM symbol is behind a location of a sub-slot n. Alternatively, the HARQ-ACK codebook does not comprise a HARQ-ACK location of a PDSCH for which the end location of its last OFDM symbol is not in the front of a start point of the sub-slot n. As shown in FIG. 12, locations of last OFDM symbols of PDSCHs of a downlink slot 5 are behind a location of a sub-slot 9, and therefore a HARQ-ACK codebook transmitted on a PUCCH of the sub-slot 9 does not comprise HARQ-ACKs of these PDSCHs.

In a second processing method, a slot kd of the set KD of the DL BWP corresponds to a sub-slot L·kd+l of the UL BWP, where l=0, 1, . . . L−1, and according to sub-slots of the UL BWP, a HARQ-ACK location needs to be allocated to a PDSCH having a last OFDM symbol located in a sub-slot L·kd+q, only when there is K1 in the set K which satisfies L·kd+q+K1=n, where 0≤q<L. With this method, the number of candidate PDSCH receptions for HARQ-ACK codebook is reduced, thereby reducing a number of HARQ-ACK locations which need to be allocated, and reducing the feedback overhead.

If the overhead of the HARQ-ACK codebook needs to be further reduced, the HARQ-ACK codebook may be defined not to comprise a HARQ-ACK location of a PDSCH for which the end location of its last OFDM symbol is not in the front of a start point of a PUCCH in the sub-slot n which needs to feed back the HARQ-ACK codebook.

According to the method described above, for an uplink sub-slot n, elements in the set T which satisfy a condition are reserved to form a new set T'. For example, some of PDSCH time resources in the set T of which a last symbol of a PDSCH is located in the uplink sub-slot n are reserved to form the set T'.

Further, the set T' may be further reduced according to a semi-static slot pattern, a configured PDCCH monitoring occasion, and/or the set T', so as to obtain a set T". A total number MC of HARQ-ACK locations which need to be mapped to various possible PDSCH time resources of the slot kd may be determined according to the set T", and each PDSCH time resource of the set T" is determined to be mapped to one of the above MC HARQ-ACK locations. It should be illustrated that the disclosure does not limit a sequence of operations of sequentially obtaining the set T" according to the first/second processing method in accordance with the semi-static slot pattern, and the configured PDCCH monitoring occasion. The following detailed description of these operations is merely illustrative.

Based on the above methods, for a slot kd of the set KD of the DL BWP, PDSCH resources of only a part of elements of the set T may be schedulable, and these schedulable PDSCH resources constitute the above set T". A number of required HARQ-ACK locations may be determined according to the schedulable elements of the set T, and one HARQ-ACK location occupied by each schedulable element is determined. The schedulable elements satisfy one or more of the following conditions.

In a first condition, any one OFDM symbol of the PDSCH resources of the schedulable elements cannot be indicated as an uplink OFDM symbol in a semi-static slot pattern.

In a second condition, according to a parameter K0 of the schedulable elements, a PDCCH may be transmitted in a slot or sub-slot kd-K0 according to the parameter K0 to schedule PDSCH resources of the schedulable elements, for example, according to the configured PDCCH monitoring occasion, there may be an alternative PDCCH on the slot kd-K0 to schedule the PDSCHs of the schedulable elements. Alternatively, in the second condition, according to a parameter K0 of the schedulable elements, a PDCCH may be transmitted in a slot kd-K0 to schedule PDSCH resources of the schedulable elements, for example, according to the configured PDCCH monitoring occasion, there may be an alternative PDCCH on the slot kd-K0 to schedule the PDSCHs of the schedulable elements.

In a third condition, last OFDM symbols of PDSCHs of the schedulable elements are located in the sub-slot L·kd+q according to sub-slots of the UL BWP, where 0≤q<L, and according to the set K of K1, there is K1 which satisfies L·kd+q+K1=n.

If PDSCH resources of two schedulable elements of the set T may completely overlap or partially overlap, assuming that the UE does not need to feed back HARQ-ACK information of the two PDSCHs at the same time, a number of HARQ-ACK locations which need to be allocated may be reduced using this property. Here, the base station may not schedule the PDSCH resources of the two elements at the same time, or although the base station schedules the PDSCH resources of the two elements at the same time, the UE only feeds back HARQ-ACK information of one PDSCH according to a certain priority policy, for example, a received HARQ-ACK of a PDSCH. A total number MC of HARQ-ACK locations which need to be mapped is determined for all schedulable elements in the set T, and each of the schedulable elements is determined to be mapped to one of the above MC HARQ-ACK locations. With this method, the MC is equal to a maximum number of non-overlapping ones of the PDSCH resources of all schedulable elements of the set T.

Firstly, elements in the set T which cannot be actually scheduled are removed. A condition for determining whether an element of the set T is schedulable is that the element is considered to be schedulable only if all the first condition, the second condition, and the third condition of the schedulable element are satisfied. Alternatively, the condition for determining whether an element of the set T is schedulable is that the element is considered to be schedulable when the first condition and the third condition of the schedulable element are satisfied. Alternatively, the condition for determining whether an element of the set T is schedulable is that the element is considered to be schedulable when the second condition and the third condition of the schedulable element are satisfied. Alternatively, the condition for determining whether an element of the set T is schedulable is that the element is considered to be schedulable when the third condition of the schedulable element is satisfied.

HARQ-ACK locations are then mapped to all schedulable elements in the set T. If the set T is an empty set, MC is equal to 0, otherwise, the total number MC of HARQ-ACK locations which need to be mapped is determined according to the following operations, and each element is determined to be mapped to one of the above MC HARQ-ACK locations:

1) initializing a count h of the HARQ-ACK locations to be 0;
2) for a current set T, determining a minimum index value of a last OFDM symbol of a PDSCH represented by each element, and denoting the minimum index value as E;
3) for an element of the current set T, denoting a location of an initial OFDM symbol of a PDSCH represented by the element as S, wherein S≤E, and then mapping the PDSCH represented by this element to a HARQ-ACK location h, removing the element of the current set T, and repeatedly performing 3) until all elements which satisfy S≤E are processed; and
4) h=h+1; and if the current set T is not empty, proceeding to 2), otherwise, MC=h, and ending the procedure.

When the HARQ-ACK locations mapped to the schedulable elements are determined according to the above operations, 1) to 4) may be performed respectively with an uplink sub-slot as a granularity, or 1) to 4) may be performed with a downlink slot as a granularity.

Figure 15:
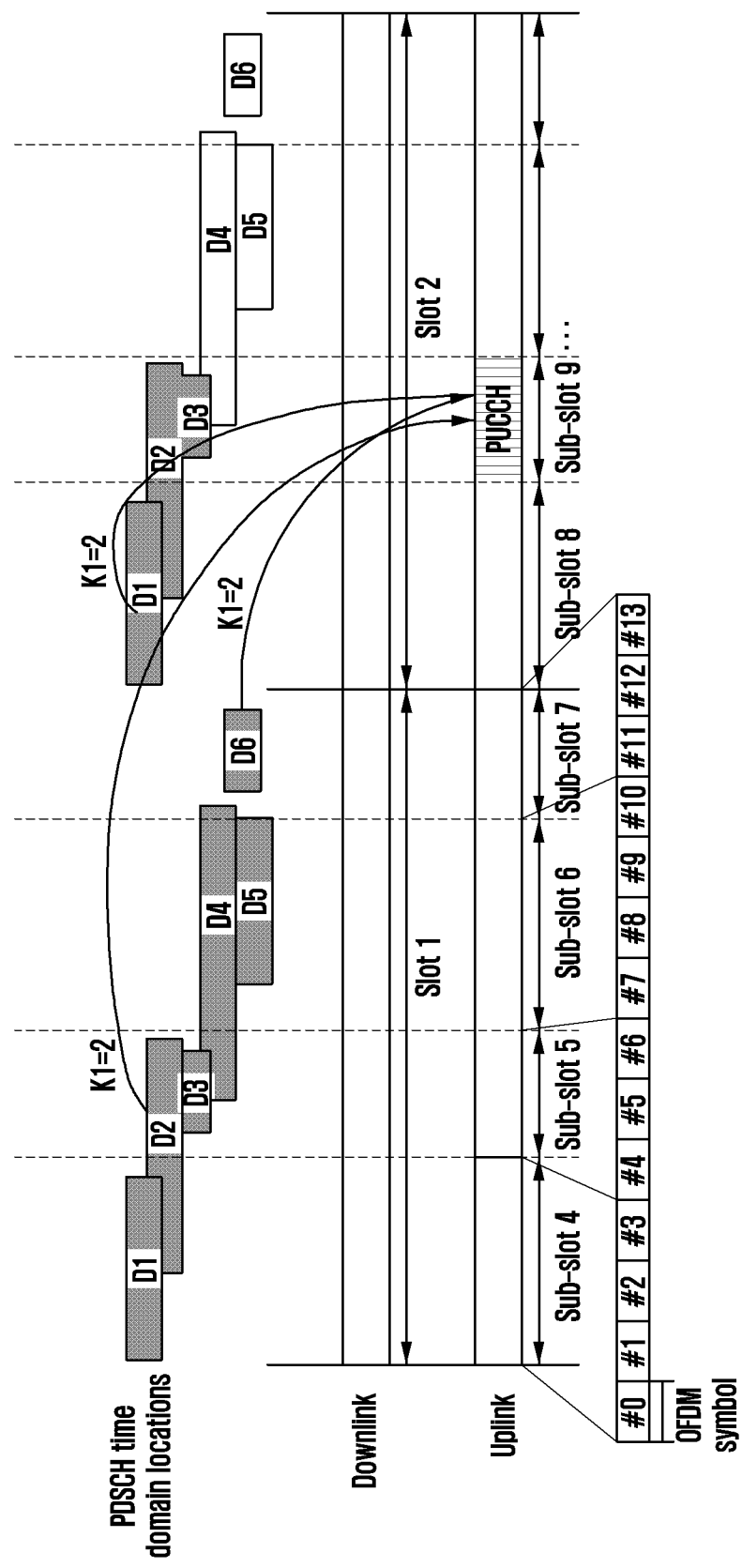
FIG. 15 illustrates a first example in which HARQ-ACK locations corresponding to various candidate PDSCH receptions in a downlink slot kd in a set KD are determined according to an embodiment of the disclosure.

FIG. 15 illustrates a first example in which HARQ-ACK locations corresponding to various candidate PDSCH receptions in a downlink slot kd in a set KD are determined according to an embodiment of the disclosure.

Referring to FIG. 15, it is assumed that L=4, one uplink slot is divided into four sub-slots, symbols #0-#3 belong to a sub-slot #0, symbols #4-#6 belong to a sub-slot #1, symbols #7-#10 belong to a sub-slot #2, and symbols #11-#13 belong to a sub-slot #3. A set K of K1 is {−2, −1, 0, 2, 3, 4}. A base station schedules a UE to transmit a PUCCH in an uplink sub-slot 9. According to the first method for determining a HARQ-ACK timing, it is determined that a downlink slot set KD for feeding back a HARQ-ACK comprises a downlink slot 1 and a downlink slot 2, and possible values of K1 are K1=−2 and K1=2. It is assumed that there are six PDSCHs in the set T which satisfy the first condition, and are represented by D1 to D6, respectively. In the downlink slot set KD, operations 1) to 4) are performed in units of downlink slots, and then a slot 1 comprises four HARQ-ACK locations, which are D1, D3, D5, and D6, respectively, D2 and D1 belong to the same HARQ-ACK location, and D4 and D3 belong to the same HARQ-ACK location, and a slot 2 comprises two HARQ-ACK locations, which are D1 and D3 respectively, and D2 and D1 belong to the same HARQ-ACK location. Last OFDM symbols of other PDSCHs in the slot 2 are later than a sub-slot 9, and therefore no HARQ-ACK location is reserved. It is assumed that the base station schedules PDSCH D2 and PDSCH D6 of the slot 1 as well as PDSCH D1 of the slot 2, and indicated values of K1 are K1=2, K1=2 and K1=−2, respectively. Therefore, a HARQ-ACK codebook is XNNXXN, wherein X is an ACK or NACK generated according to a result of PDSCH decoding, and N is a placeholder bit having a predefined value, such as NACK. If operations 1) to 4) are performed in units of uplink sub-slots, four sub-slots in a downlink slot 1 comprise a total of five HARQ-ACK locations, wherein a sub-slot 4 comprises one HARQ-ACK location D1, a sub-slot 5 comprises one HARQ-ACK location, D2 and D3 belong to the same location, a sub-slot 6 comprises one HARQ-ACK location D5, and a sub-slot 7 comprises two HARQ-ACK locations D4 and D6, and in a downlink slot 2, a sub-slot 8 comprises one HARQ-ACK location D1, a sub-slot 9 comprises one HARQ-ACK location, and D2 and D3 belong to the same location. Therefore, there are a total of 7 bits of the HARQ-ACK. It is not difficult to see that D4 and D2/D5 overlap, but occupy 1-bit HARQ-ACK location respectively. If the base station cannot schedule overlapping PDSCHs, a 2-bit HARQ-ACK location is wasted.

Figure 16:
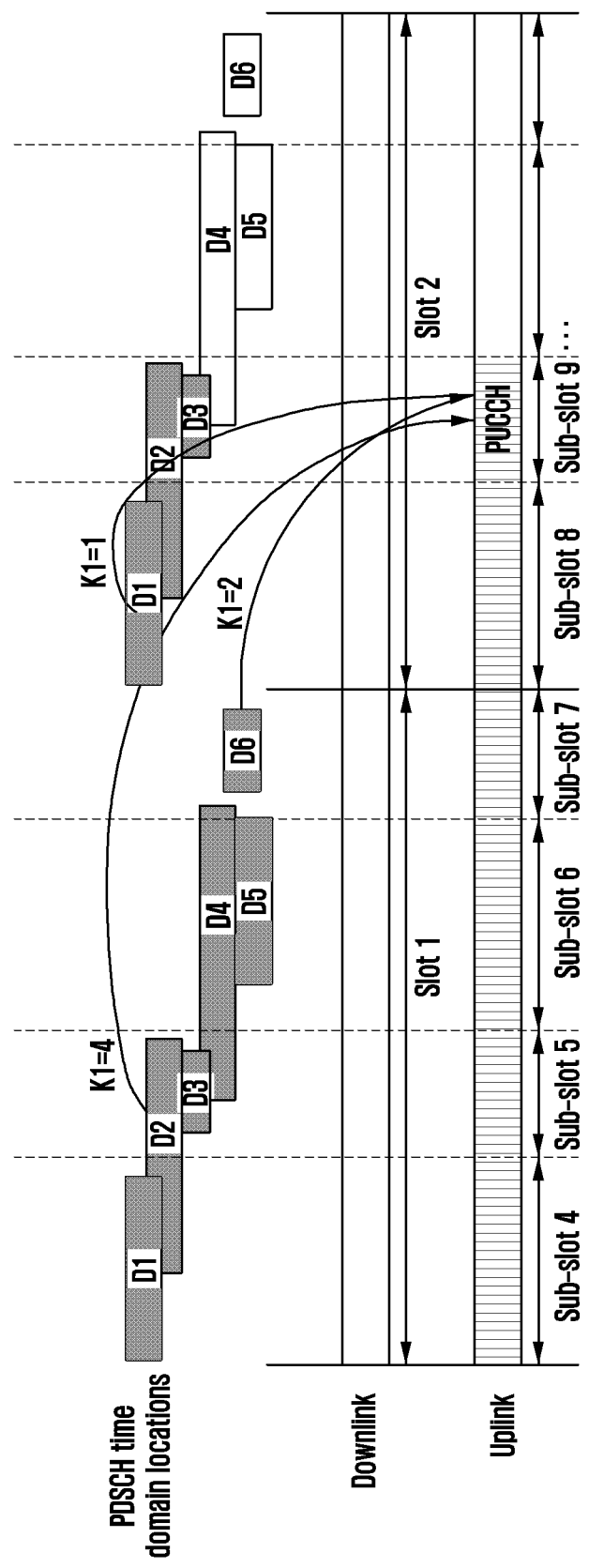
FIG. 16 illustrates a second example in which HARQ-ACK locations corresponding to various candidate PDSCH receptions in a downlink slot kd in a set KD are determined according to an embodiment of the disclosure.

FIG. 16 illustrates a second example in which HARQ-ACK locations corresponding to various candidate PDSCH receptions in a downlink slot kd in a set KD are determined according to an embodiment of the disclosure.

Referring to FIG. 16, it is assumed that L=4, one uplink slot is divided into four sub-slots, symbols #0-#3 belong to a sub-slot #0, symbols #4-#6 belong to a sub-slot #1, symbols #7-#10 belong to a sub-slot #2, and symbols #11-#13 belong to a sub-slot #3. A set K of K1 is {0, 1, 2, 3, 4, 5}. It is assumed that there are six PDSCHs in the set T which satisfy the first condition, and are represented by D1 to D6, respectively. It is assumed that a PUCCH is transmitted in a sub-slot 9. According to the second method for determining a HARQ-ACK timing, it is determined that a downlink slot set KD for feeding back a HARQ-ACK comprises a downlink slot 1 and a downlink slot 2. Further, according to the second processing method, it may be determined that PDSCHs having a last symbol located in sub-slots 4, 5, 6, 7, 8 and 9 in the downlink slot set are D1-D6 in the slot 1 and D1, D2 and D3 in the slot 2. If operations 1) to 4) are performed in units of downlink slots, a slot 1 comprises four HARQ-ACK locations, which are D1, D3, D5, and D6, respectively, D2 and D1 belong to the same HARQ-ACK location, and D4 and D3 belong to the same HARQ-ACK location, and a slot 2 comprises two HARQ-ACK locations, which are D1 and D3 respectively, and D2 and D1 belong to the same HARQ-ACK location. Last OFDM symbols of other PDSCHs in the slot 2 are later than a sub-slot 9, and therefore no HARQ-ACK location is reserved. It is assumed that the base station schedules PDSCH D2 and PDSCH D6 of the slot 1 as well as PDSCH D1 of the slot 2, and indicated values of K1 are K1=4, K1=2 and K1=1, respectively. Therefore, a HARQ-ACK codebook is XNNXXN, wherein X is an ACK or NACK generated according to a result of PDSCH decoding, and N is a placeholder bit having a predefined value, such as NACK. If operations 1) to 4) are performed in units of uplink sub-slots, four sub-slots in a downlink slot 1 comprise a total of five HARQ-ACK locations, wherein a sub-slot 4 comprises one HARQ-ACK location D1, a sub-slot 5 comprises one HARQ-ACK location, D2 and D3 belong to the same location, a sub-slot 6 comprises one HARQ-ACK location D5, and a sub-slot 7 comprises two HARQ-ACK locations D4 and D6, and in a downlink slot 2, a sub-slot 8 comprises one HARQ-ACK location D1, a sub-slot 9 comprises one HARQ-ACK location, and D2 and D3 belong to the same location. Therefore, there are a total of 7 bits of the HARQ-ACK. It is not difficult to see that D4 and D2/D5 overlap, but occupy 1-bit HARQ-ACK location respectively. If the base station cannot schedule overlapping PDSCHs, a 2-bit HARQ-ACK location is wasted. It is not difficult to see that different methods are specifically used in FIG. 16 and FIG. 15, but finally generate the same HARQ-ACK codebook.

As described above, in one uplink slot, the UE may transmit multiple PUCCHs, and a HARQ-ACK codebook of each PUCCH is determined according to the method described above.

Figure 17:
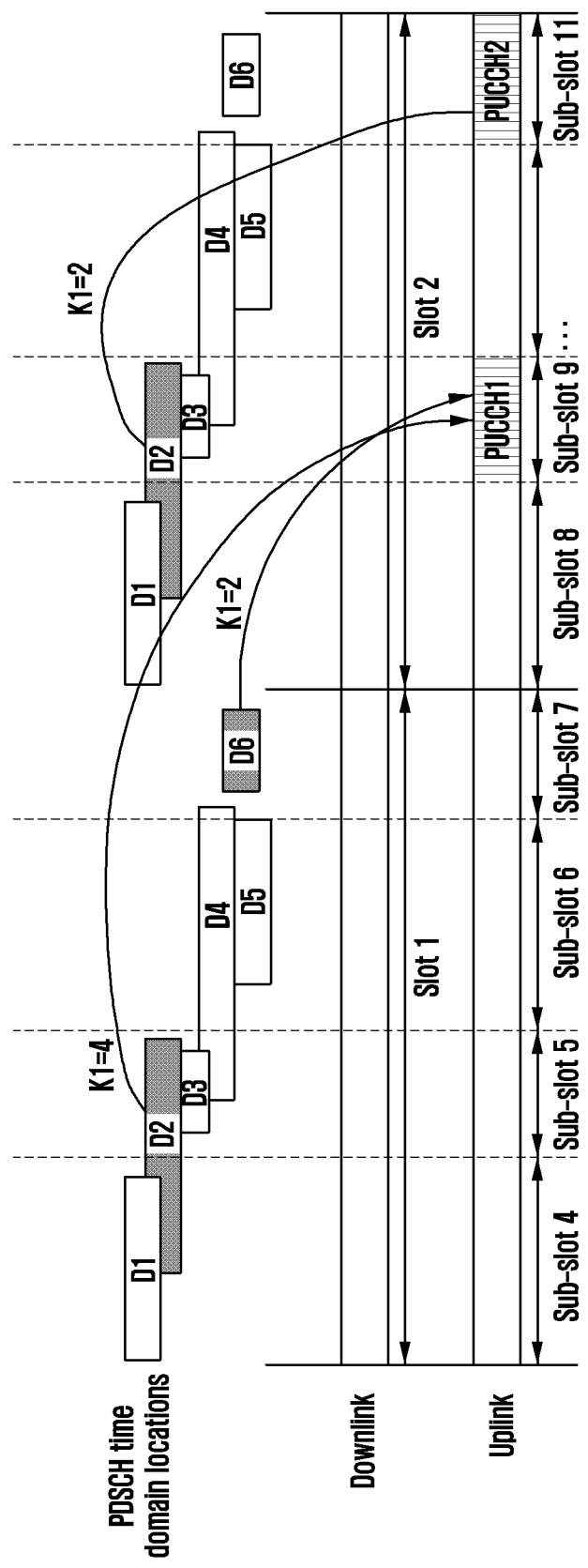
FIG. 17 illustrates a third example in which HARQ-ACK locations corresponding to various candidate PDSCH receptions in a downlink slot kd in a set KD are determined according to an embodiment of the disclosure.

FIG. 17 illustrates a third example in which HARQ-ACK locations corresponding to various candidate PDSCH receptions in a downlink slot kd in a set KD are determined according to an embodiment of the disclosure.

Referring to FIG. 17, a set K of K1 is {0, 1, 2, 3, 4, 5}, and it is assumed that a UE transmits PUCCH1 and PUCCH2 in a sub-slot 9 and a sub-slot 11, respectively, wherein K1=4 and K1=2 are indicated for two PDSCHs in locations D2 and D6 in the downlink slot 1, and K1=2 is indicated for a PDSCH in a location D2 in the downlink slot 2. Then, according to the method described above, the HARQ-ACK codebook transmitted in PUCCH1 is XNNXNN, wherein X is an ACK or NACK generated according to a result of PDSCH decoding, and N is a placeholder bit. The HARQ-ACK codebook transmitted in PUCCH2 should correspond to PDSCHs having an end location of a PDSCH symbol located in sub-slots 6-11, which are D4-D6 in the slot 1 and D1-D6 in the slot 2. If operations 1) to 4) are performed in units of downlink slots, the slot 1 comprises two HARQ-ACK locations, wherein D4/D5 corresponds to the same location, and D6 corresponds to a second location, and the slot 2 comprises four HARQ-ACK locations which are D1, D3, D5 and D6, respectively, wherein D2 and D1 belong to the same HARQ-ACK location, and D4 and D3 belong to the same HARQ-ACK location. Therefore, the HARQ-ACK codebook transmitted in the PUCCH2 is NNXNNN, wherein X is an ACK or NACK generated according to a result of PDSCH decoding, and N is a placeholder bit.

Figure 18:
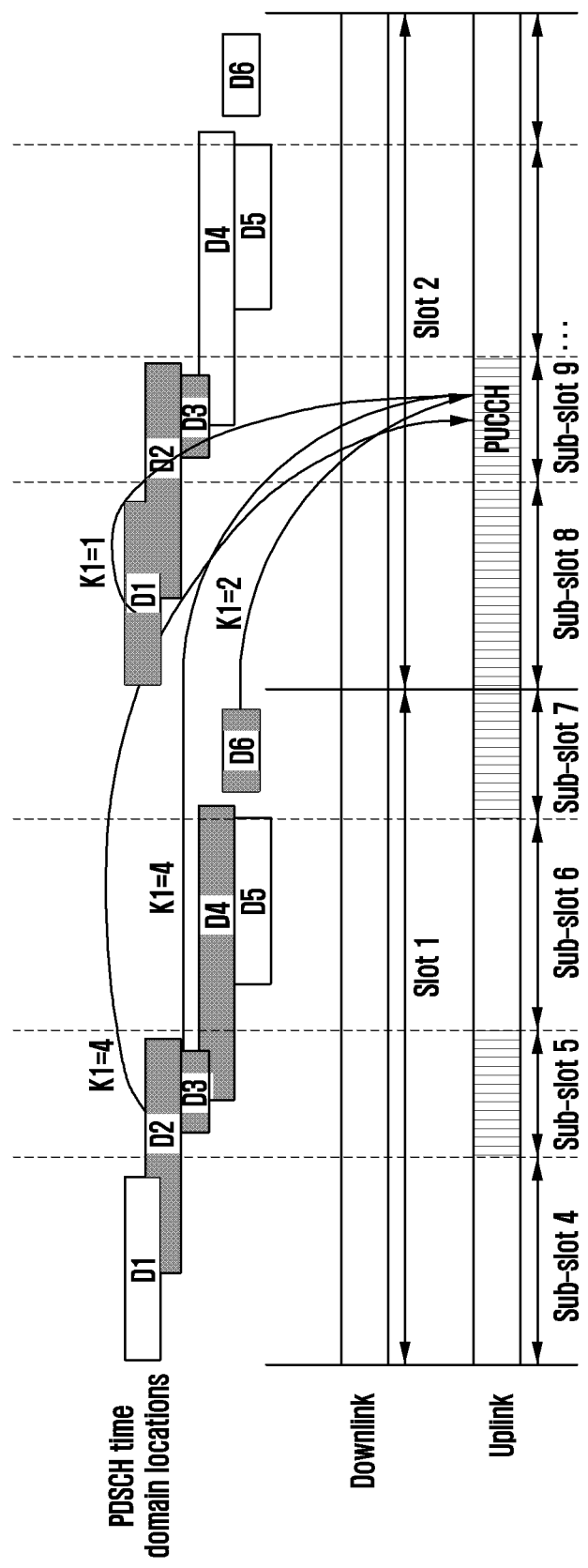
FIG. 18 illustrates a fourth example in which HARQ-ACK locations corresponding to various candidate PDSCH receptions in a downlink slot kd in a set KD are determined according to an embodiment of the disclosure.

FIG. 18 illustrates a fourth example in which HARQ-ACK locations corresponding to various candidate PDSCH receptions in a downlink slot kd in a set KD are determined according to an embodiment of the disclosure.

Referring to FIG. 18, it is assumed that L=4, one uplink slot is divided into four sub-slots, symbols #0-#3 belong to a sub-slot #0, symbols #4-#6 belong to a sub-slot #1, symbols #7-#10 belong to a sub-slot #2, and symbols #11-#13 belong to a sub-slot #3. A set K of K1 is {0, 1, 2, 4}. It is assumed that there are six PDSCHs in the set T which satisfy the first condition, and are represented by D1 to D6, respectively. It is assumed that a PUCCH is transmitted in a sub-slot 9. According to the second method for determining a HARQ-ACK timing, it is determined that a downlink slot set KD for feeding back a HARQ-ACK comprises a downlink slot 1 and a downlink slot 2. Further, according to the second processing method, it may be determined that PDSCHs having a last symbol located in sub-slots 5, 7, 8 and 9 in the downlink slot set are D2, D3, D4 and D6 in the slot 1 and D1, D2 and D3 in the slot 2. If operations 1) to 4) are performed in units of downlink slots, a slot 1 comprises two HARQ-ACK locations, which are D2, and D6, respectively, and D3/D4 and D2 belong to the same HARQ-ACK location, and a slot 2 comprises two HARQ-ACK locations, which are D1 and D3 respectively, and D2 and D1 belong to the same HARQ-ACK location. It is assumed that the base station schedules PDSCH D2 and PDSCH D6 of the slot 1 as well as PDSCH D1 of the slot 2. Therefore, a HARQ-ACK codebook is XXXN, wherein X is an ACK or NACK generated according to a result of PDSCH decoding. If operations 1) to 4) are performed in units of uplink sub-slots, a sub-slot 5 comprises one HARQ-ACK location, D2 and D3 belong to the same location, a sub-slot 7 comprises two HARQ-ACK locations D4 and D6, a sub-slot 8 comprises one HARQ-ACK location D1, a sub-slot 9 comprises one HARQ-ACK location, and D2 and D3 belong to the same location. Therefore, there are a total of 5 bits of the HARQ-ACK, and the HARQ-ACK codebook is XNXXN. It is not difficult to see that D4 and D2 overlap, but occupy 1-bit HARQ-ACK location respectively. If the base station cannot schedule overlapping PDSCHs, a 1-bit HARQ-ACK location is wasted, that is, a location of a first N in XNXXN is wasted.

Figure 19:
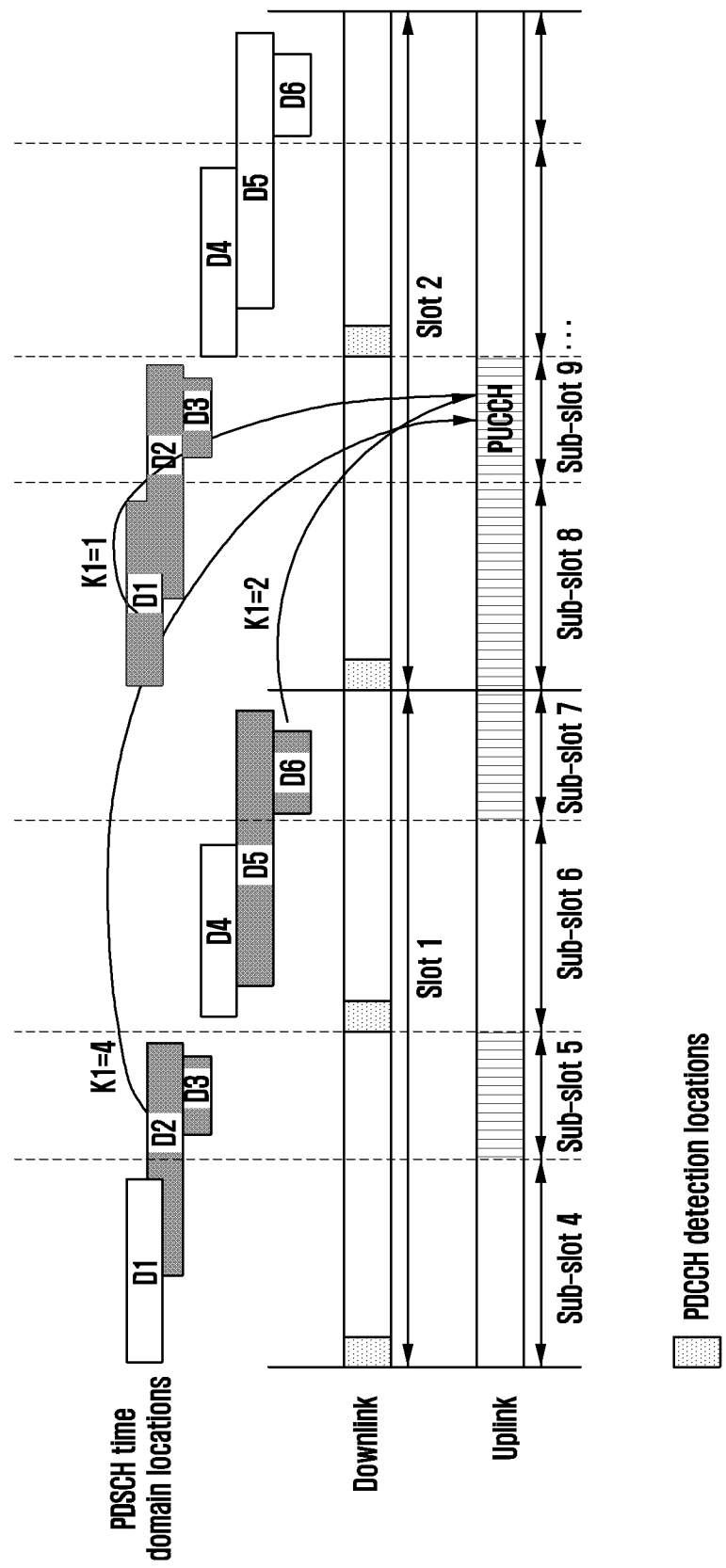
FIG. 19 illustrates a fifth example in which HARQ-ACK locations corresponding to various candidate PDSCH receptions in a downlink slot kd in a set KD are determined according to an embodiment of the disclosure.

FIG. 19 illustrates a fifth example in which HARQ-ACK locations corresponding to various candidate PDSCH receptions in a downlink slot kd in a set KD are determined according to an embodiment of the disclosure.

Referring to FIG. 19, it is assumed that L=4, one uplink slot is divided into four sub-slots, symbols #0-#3 belong to a sub-slot #0, symbols #4-#6 belong to a sub-slot #1, symbols #7-#10 belong to a sub-slot #2, and symbols #11-#13 belong to a sub-slot #3. A set K of K1 is {0, 1, 2, 4}. It is assumed that in one downlink slot, a symbol #0 and a symbol #7 each have a PDCCH monitoring occasion, a set T is determined according to the configured TDRA with the PDCCH monitoring occasion as a reference, and there are six PDSCHs in the set T which satisfy the first condition, and are represented by D1 to D6, respectively. It is assumed that a PUCCH is transmitted in a sub-slot 9. According to the second method for determining a HARQ-ACK timing, it is determined that a downlink slot set KD for feeding back a HARQ-ACK comprises a downlink slot 1 and a downlink slot 2. Further, according to the second processing method, it may be determined that PDSCHs having a last symbol located in sub-slots 5, 7, 8 and 9 in the downlink slot set are D2, D3, D5 and D6 in the slot 1 and D1, D2 and D3 in the slot 2. If operations 1) to 4) are performed in units of downlink slots, a slot 1 comprises two HARQ-ACK locations, which are D2, and D6, respectively, D3 and D2 belong to the same HARQ-ACK location, and D5 and D6 belong to the same HARQ-ACK location, and a slot 2 comprises two HARQ-ACK locations, which are D1 and D3 respectively, and D2 and D1 belong to the same HARQ-ACK location. It is assumed that the base station schedules PDSCH D2 and PDSCH D6 of the slot 1 as well as PDSCH D1 of the slot 2. Therefore, a HARQ-ACK codebook is XXXN, wherein X is an ACK or NACK generated according to a result of PDSCH decoding. If operations 1) to 4) are performed in units of uplink sub-slots, a sub-slot 5 comprises one HARQ-ACK location, D2 and D3 belong to the same location, a sub-slot 7 comprises one HARQ-ACK location, D5 and D6 belong to the same location, a sub-slot 8 comprises one HARQ-ACK location D1, a sub-slot 9 comprises one HARQ-ACK location, and D2 and D3 belong to the same location. Therefore, there are a total of 4 bits of the HARQ-ACK, and the HARQ-ACK codebook is XXXN.

Figure 20:
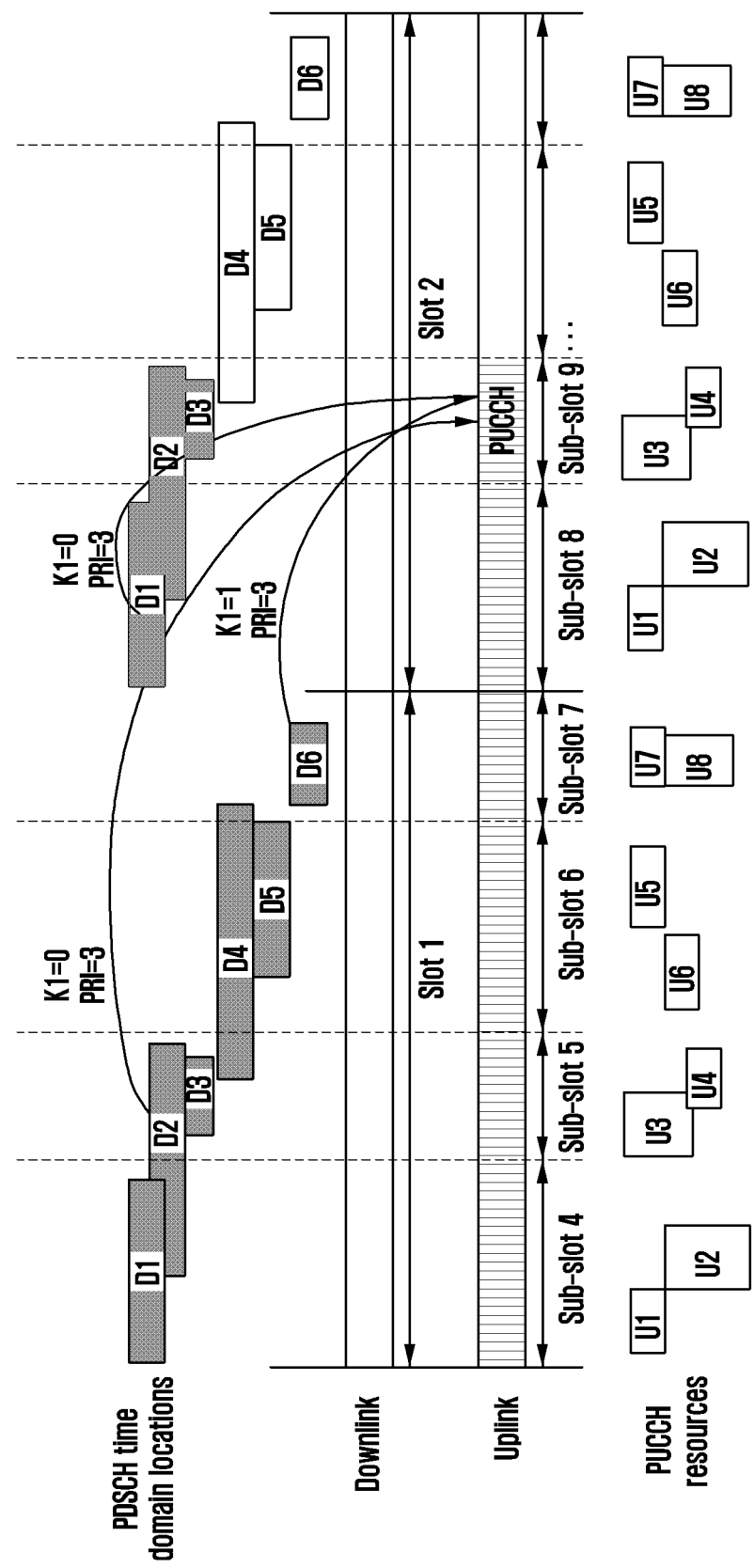
FIG. 20 illustrates a sixth example in which HARQ-ACK locations corresponding to various candidate PDSCH receptions in a downlink slot kd in a set KD are determined according to an embodiment of the disclosure.

FIG. 20 illustrates a sixth example in which HARQ-ACK locations corresponding to various candidate PDSCH receptions in a downlink slot kd in a set KD are determined according to an embodiment of the disclosure.

Referring to FIG. 20, it is assumed that L=4, one uplink slot is divided into four sub-slots, symbols #0-#3 belong to a sub-slot #0, symbols #4-#6 belong to a sub-slot #1, symbols #7-#10 belong to a sub-slot #2, and symbols #11-#13 belong to a sub-slot #3. A set K of K1 is {0, 1} with a granularity of an uplink slot. It is assumed that there are six PDSCHs in the set T which satisfy the first condition, and are represented by D1 to D6, respectively. It is assumed that a PRI has 3 bits, indicating eight PUCCH resources which are represented as U1-U8. A PUCCH is transmitted in a location of U4 in a sub-slot 9. According to the third method for determining a HARQ-ACK timing, it is determined that a downlink slot set KD for feeding back a HARQ-ACK comprises a downlink slot 1 and a downlink slot 2. Further, according to the first processing method, it may be determined that in the downlink slot set, D1-D6 in the slot 1 and D1-D3 in the slot 2 all satisfy the requirements. If operations 1) to 4) are performed in units of downlink slots, a slot 1 comprises four HARQ-ACK locations, which are D1, D3, D5, and D6, respectively, D1 and D2 belong to the same HARQ-ACK location, and D3 and D4 belong to the same HARQ-ACK location, and a slot 2 comprises two HARQ-ACK locations, which are D1 and D3 respectively, and D2 and D1 belong to the same HARQ-ACK location. It is assumed that the base station schedules PDSCH D2 and PDSCH D6 of the slot 1 as well as PDSCH D1 of the slot 2. Therefore, a HARQ-ACK codebook is XNNXXN, wherein X is an ACK or NACK generated according to a result of PDSCH decoding. If operations 1) to 4) are performed in units of uplink sub-slots, sub-slots 4, 5, 6, 7, 8, and 9 comprise one HARQ-ACK location, one HARQ-ACK location, one HARQ-ACK location, two HARQ-ACK locations, one HARQ-ACK location and one HARQ-ACK location respectively. Therefore, there are a total of 7 bits of the HARQ-ACK. It is not difficult to see that D4 and D2 overlap, but occupy 1-bit HARQ-ACK location respectively. If the base station cannot schedule overlapping PDSCHs, a 1-bit HARQ-ACK location is wasted.

The above description of how to determine the HARQ-ACK locations corresponding to the PDSCHs in one downlink slot kd is described as an example in which the uplink BWP and the downlink BWP have the same slot length, but it is also applicable to a case where the uplink BWP and the downlink BWP have different slot lengths, which will not be described in detail again.

Figure 21:
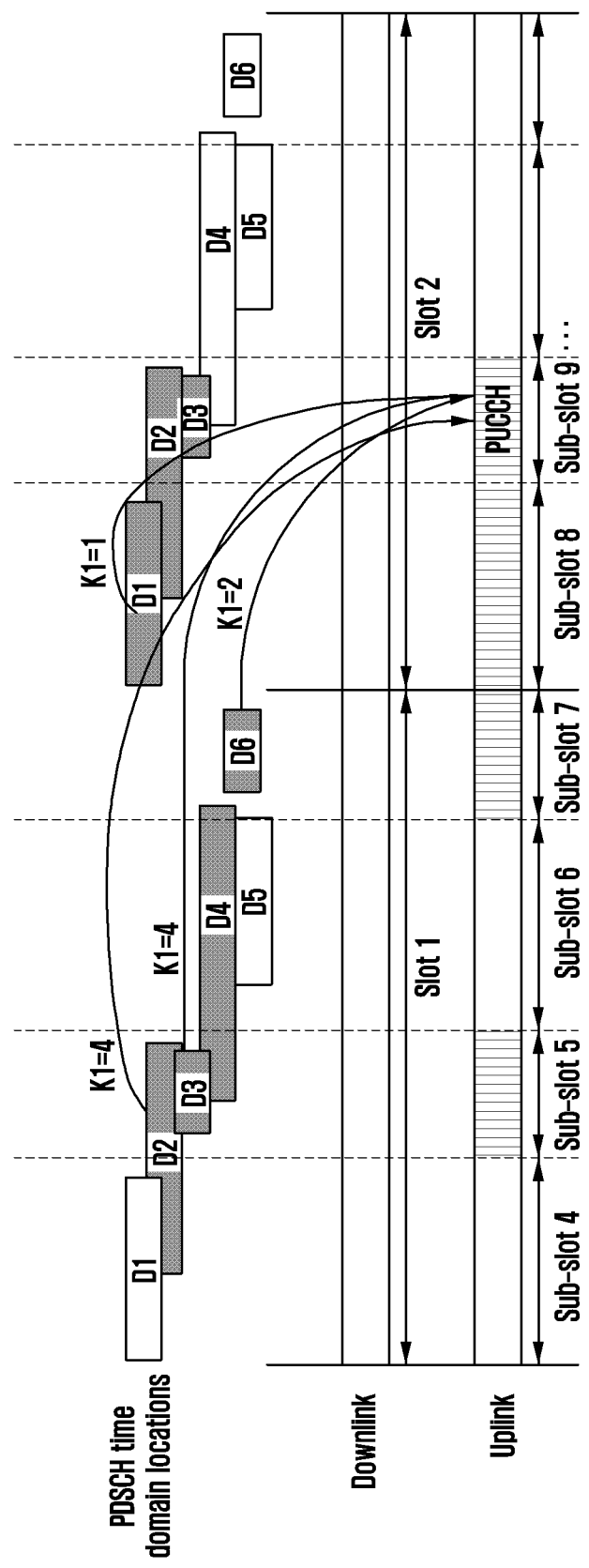
FIG. 21 illustrates a seventh example in which HARQ-ACK locations corresponding to various candidate PDSCH receptions in a downlink slot kd in a set KD are determined according to an embodiment of the disclosure.

FIG. 21 illustrates a seventh example in which HARQ-ACK locations corresponding to various candidate PDSCH receptions in a downlink slot kd in a set KD are determined according to an embodiment of the disclosure.

The method for determining the set T" according to PDSCH resources which do not overlap described above is applicable to a case where the UE needs not to feed back HARQ-ACK information of two candidate PDSCH receptions of the set T which completely overlap or partially overlap at the same time. That is, if the base station schedules two PDSCHs which overlap each other, the base station needs to instruct the UE to feed back HARQ-ACKs of the two PDSCHs in different HARQ-ACK codebooks, for example, by setting different K1s or PRIs, so that PUCCHs of the HARQ-ACKs of the two PDSCHs are located in different uplink sub-slots or on different frequency domain resources. In some other scenarios, for example, when eMBB services and URLLC services multiplex, the base station may schedule multiple PDSCHs, time domain resources corresponding to the PDSCHs overlap, and the UE needs to feed back HARQ-ACKs of the PDSCHs in the same HARQ-ACK codebook. For example, the base station schedules PDSCH1 of one eMBB service in a PDSCH location D2 in FIG. 21, and then the base station further schedules PDSCH2 of one URLLC service in a location D3. In one implementation, the base station not only transmits the PDSCH1 in the location D2, but also transmits the PDSCH2 in the location D3, and the two PDSCHs overlap. In another implementation, the base station not only transmits the PDSCH2 in the location D3, but also transmits the PDSCH1 in a portion of the location D2 which does not overlap with D3. For the two cases, it may be beneficial for the UE to both feed back a HARQ-ACK of the PDSCH1 and a HARQ-ACK of the PDSCH2. In order to support such a scenario, in one implementation, HARQ-ACK locations are simply mapped according to all schedulable elements, regardless of whether or not these schedulable elements overlap. As shown in FIG. 21, according to the second processing method, it may be determined that in this downlink slot set, PDSCHs having a last symbol located in sub-slots 5, 7, 8, and 9 are D2, D3, D4 and D6 in a slot 1 and D1, D2 and D3 in a slot 2 respectively. Then, for these seven PDSCH locations, HARQ-ACK locations are reserved, and the HARQ-ACK codebook is XXNXXNN, wherein X is an ACK or NACK generated according to a result of PDSCH decoding.

In addition, there is a case that there is no less than one indication granularity of K1, for example, an indication granularity of K1 in some DCI formats is a slot, and an indication granularity of K1 in some DCI formats is a sub-slot, and HARQ-ACKs of PDSCHs scheduled by these DCIs may be placed in the same HARQ-ACK codebook. In this case, it is necessary to consider values and granularities of all possible K1s when the downlink slot set KD is determined.

In correspondence with the methods described above, the application further discloses a device, which may be used to implement the methods described above.

Figure 22:
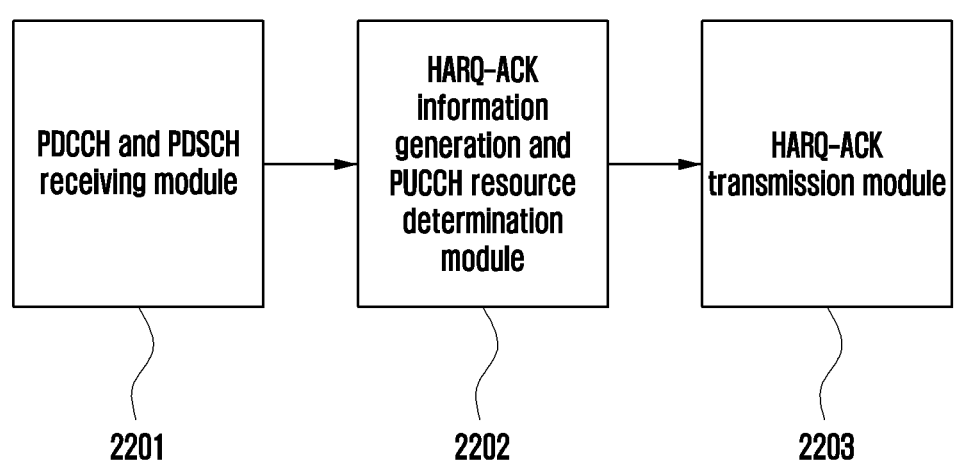
FIG. 22 illustrates another schematic diagram of a user equipment according to an embodiment of the disclosure.

FIG. 22 illustrates another schematic diagram of a user equipment according to an embodiment of the disclosure.

Referring to FIG. 22, the device comprises a PDCCH and PDSCH receiving module 2201, a HARQ-ACK information generation and PUCCH resource determination module 2202, and a HARQ-ACK transmission module 2203, wherein, the PDCCH and PDSCH receiving module 2201 is configured to detect a PDCCH and receive a PDSCH scheduled by the PDCCH.

The HARQ-ACK information generation and PUCCH resource determination module 2202 is configured to determine HARQ-ACK information which needs to be fed back and PUCCH resources for transmitting a UCI according to at least the time domain duration of scheduling unit in a downlink BWP and an uplink BWP, and a PUCCH resource indication, and/or HARQ-ACK timing information.

The HARQ-ACK transmission module 2203 is configured to transmit the HARQ-ACK information on the PUCCH resources.

Figure 23:
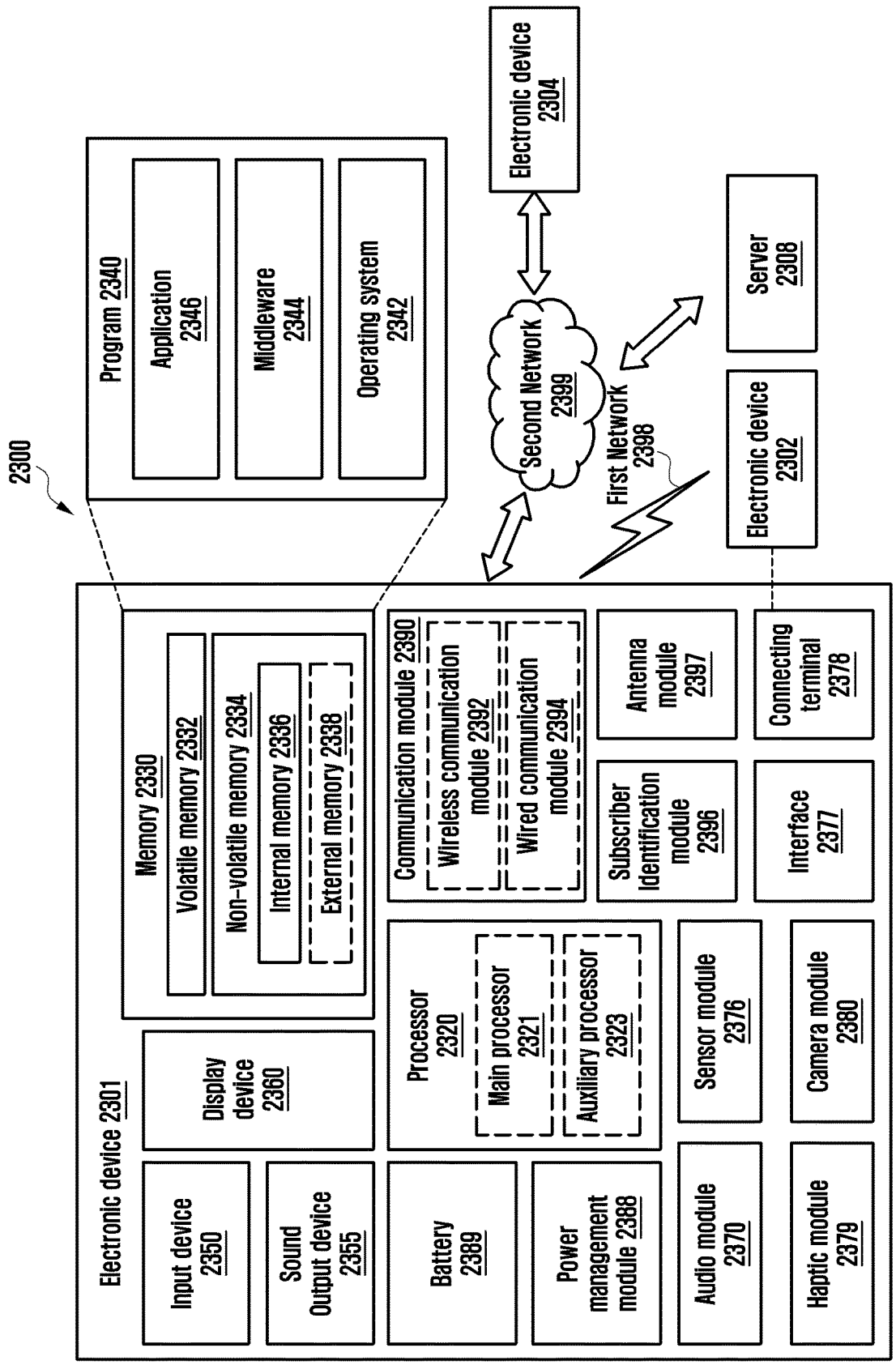
FIG. 23 is a block diagram illustrating an electronic device 2301 in a network environment 2300 according to an embodiment of the disclosure.

FIG. 23 is a block diagram illustrating an electronic device 2301 in a network environment 2300 according to an embodiment of the disclosure. The electronic device 2301 may be the UE shown in FIG. 3. Referring to FIG. 23, the electronic device 2301 in the network environment 2300 may communicate with an electronic device 2302 via a first network 2398 (e.g., a short-range wireless communication network), or an electronic device 2304 or a server 2308 via a second network 2399 (e.g., a long-range wireless communication network). According to an embodiment, the electronic device 2301 may communicate with the electronic device 2304 via the server 2308. According to an embodiment, the electronic device 2301 may include a processor 2320, memory 2330, an input device 2350, a sound output device 2355, a display device 2360, an audio module 2370, a sensor module 2376, an interface 2377, a haptic module 2379, a camera module 2380, a power management module 2388, a battery 2389, a communication module 2390, a subscriber identification module (SIM) 2396, or an antenna module 2397. In some embodiments, at least one (e.g., the display device 2360 or the camera module 2380) of the components may be omitted from the electronic device 2301, or one or more other components may be added in the electronic device 2301. In some embodiments, some of the components may be implemented as single integrated circuitry. For example, the sensor module 2376 (e.g., a fingerprint sensor, an iris sensor, or an illuminance sensor) may be implemented as embedded in the display device 2360 (e.g., a display).

The processor 2320 may execute, for example, software (e.g., a program 2340) to control at least one other component (e.g., a hardware or software component) of the electronic device 2301 coupled with the processor 2320, and may perform various data processing or computation. According to one embodiment, as at least part of the data processing or computation, the processor 2320 may load a command or data received from another component (e.g., the sensor module 2376 or the communication module 2390) in volatile memory 2332, process the command or the data stored in the volatile memory 2332, and store resulting data in non-volatile memory 2334. According to an embodiment, the processor 2320 may include a main processor 2321 (e.g., a central processing unit (CPU) or an application processor (AP)), and an auxiliary processor 2323 (e.g., a graphics processing unit (GPU), an image signal processor (ISP), a sensor hub processor, or a communication processor (CP)) that is operable independently from, or in conjunction with, the main processor 2321. Additionally or alternatively, the auxiliary processor 2323 may be adapted to consume less power than the main processor 2321, or to be specific to a specified function. The auxiliary processor 2323 may be implemented as separate from, or as part of the main processor 2321.

The auxiliary processor 2323 may control at least some of functions or states related to at least one component (e.g., the display device 2360, the sensor module 2376, or the communication module 2390) among the components of the electronic device 2301, instead of the main processor 2321 while the main processor 2321 is in an inactive (e.g., sleep) state, or together with the main processor 2321 while the main processor 2321 is in an active state (e.g., executing an application). According to an embodiment, the auxiliary processor 2323 (e.g., an image signal processor or a communication processor) may be implemented as part of another component (e.g., the camera module 2380 or the communication module 2390) functionally related to the auxiliary processor 2323.

The memory 2330 may store various data used by at least one component (e.g., the processor 2320 or the sensor module 2376) of the electronic device 2301. The various data may include, for example, software (e.g., the program 2340) and input data or output data for a command related thererto. The memory 2330 may include the volatile memory 2332 or the non-volatile memory 2334.

The program 2340 may be stored in the memory 2330 as software, and may include, for example, an operating system (OS) 2342, middleware 2344, or an application 2346.

The input device 2350 may receive a command or data to be used by other component (e.g., the processor 2320) of the electronic device 2301, from the outside (e.g., a user) of the electronic device 2301. The input device 2350 may include, for example, a microphone, a mouse, a keyboard, or a digital pen (e.g., a stylus pen).

The sound output device 2355 may output sound signals to the outside of the electronic device 2301. The sound output device 2355 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 2360 may visually provide information to the outside (e.g., a user) of the electronic device 2301. The display device 2360 may include, for example, a display, a hologram device, or a projector and control circuitry to control a corresponding one of the display, hologram device, and projector. According to an embodiment, the display device 2360 may include touch circuitry adapted to detect a touch, or sensor circuitry (e.g., a pressure sensor) adapted to measure the intensity of force incurred by the touch.

The audio module 2370 may convert a sound into an electrical signal and vice versa. According to an embodiment, the audio module 2370 may obtain the sound via the input device 2350, or output the sound via the sound output device 2355 or a headphone of an external electronic device (e.g., an electronic device 2302) directly (e.g., wiredly) or wirelessly coupled with the electronic device 2301.

The sensor module 2376 may detect an operational state (e.g., power or temperature) of the electronic device 2301 or an environmental state (e.g., a state of a user) external to the electronic device 2301, and then generate an electrical signal or data value corresponding to the detected state. According to an embodiment, the sensor module 2376 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 2377 may support one or more specified protocols to be used for the electronic device 2301 to be coupled with the external electronic device (e.g., the electronic device 2302) directly (e.g., wiredly) or wirelessly. According to an embodiment, the interface 2377 may include, for example, a high definition multimedia interface (HDMI), a universal serial bus (USB) interface, a secure digital (SD) card interface, or an audio interface.

A connecting terminal 2378 may include a connector via which the electronic device 2301 may be physically connected with the external electronic device (e.g., the electronic device 2302). According to an embodiment, the connecting terminal 2378 may include, for example, a HDMI connector, a USB connector, a SD card connector, or an audio connector (e.g., a headphone connector).

The haptic module 2379 may convert an electrical signal into a mechanical stimulus (e.g., a vibration or a movement) or electrical stimulus which may be recognized by a user via his tactile sensation or kinesthetic sensation. According to an embodiment, the haptic module 2379 may include, for example, a motor, a piezoelectric element, or an electric stimulator.

The camera module 2380 may capture a still image or moving images. According to an embodiment, the camera module 2380 may include one or more lenses, image sensors, image signal processors, or flashes.

The power management module 2388 may manage power supplied to the electronic device 2301. According to one embodiment, the power management module 2388 may be implemented as at least part of, for example, a power management integrated circuit (PMIC).

The battery 2389 may supply power to at least one component of the electronic device 2301. According to an embodiment, the battery 2389 may include, for example, a primary cell which is not rechargeable, a secondary cell which is rechargeable, or a fuel cell.

The communication module 2390 may support establishing a direct (e.g., wired) communication channel or a wireless communication channel between the electronic device 2301 and the external electronic device (e.g., the electronic device 2302, the electronic device 2304, or the server 2308) and performing communication via the established communication channel. The communication module 2390 may include one or more communication processors that are operable independently from the processor 2320 (e.g., the application processor (AP)) and supports a direct (e.g., wired) communication or a wireless communication. According to an embodiment, the communication module 2390 may include a wireless communication module 2392 (e.g., a cellular communication module, a short-range wireless communication module, or a global navigation satellite system (GNSS) communication module) or a wired communication module 2394 (e.g., a local area network (LAN) communication module or a power line communication (PLC) module). A corresponding one of these communication modules may communicate with the external electronic device via the first network 2398 (e.g., a short-range communication network, such as Bluetooth™, wireless-fidelity (Wi-Fi) direct, or infrared data association (IrDA)) or the second network 2399 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 2392 may identify and authenticate the electronic device 2301 in a communication network, such as the first network 2398 or the second network 2399, using subscriber information (e.g., international mobile subscriber identity (IMSI)) stored in the subscriber identification module 2396.

The antenna module 2397 may transmit or receive a signal or power to or from the outside (e.g., the external electronic device) of the electronic device 2301. According to an embodiment, the antenna module 2397 may include an antenna including a radiating element composed of a conductive material or a conductive pattern formed in or on a substrate (e.g., PCB). According to an embodiment, the antenna module 2397 may include a plurality of antennas. In such a case, at least one antenna appropriate for a communication scheme used in the communication network, such as the first network 2398 or the second network 2399, may be selected, for example, by the communication module 2390 (e.g., the wireless communication module 2392) from the plurality of antennas. The signal or the power may then be transmitted or received between the communication module 2390 and the external electronic device via the selected at least one antenna. According to an embodiment, another component (e.g., a radio frequency integrated circuit (RFIC)) other than the radiating element may be additionally formed as part of the antenna module 2397.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 2301 and the external electronic device 2304 via the server 2308 coupled with the second network 2399. Each of the electronic devices 2302 and 2304 may be a device of a same type as, or a different type, from the electronic device 2301. According to an embodiment, all or some of operations to be executed at the electronic device 2301 may be executed at one or more of the external electronic devices 2302, 2304, or 2308. For example, if the electronic device 2301 should perform a function or a service automatically, or in response to a request from a user or another device, the electronic device 2301, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 2301. The electronic device 2301 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 2340) including one or more instructions that are stored in a storage medium (e.g., internal memory 2336 or external memory 2338) that is readable by a machine (e.g., the electronic device 2301). For example, a processor (e.g., the processor 2320) of the machine (e.g., the electronic device 2301) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method performed by a terminal in a communication system, the method comprising:
   identifying whether a slot offset of a row among one or more rows for physical downlink shared channel (PDSCH) time domain resource allocation (TDRA) is 0;
   identifying whether a start symbol index of a physical downlink control channel (PDCCH) monitoring occasion of the terminal is greater than 0, in case that the slot offset of the row is 0;
   generating a row by replacing a start symbol index of the row with a sum of the start symbol index of the PDCCH monitoring occasion and the start symbol index of the row, in case that the start symbol index of the PDCCH monitoring occasion is greater than 0; and
   adding the generated row to the one or more rows.

2. The method of claim 1, wherein each of the one or more rows corresponds to a slot offset from a slot allocated for a PDCCH scheduling a PDSCH to a slot allocated for the PDSCH, a start symbol index of the PDSCH, and a length of the PDSCH.

3. The method of claim 1, further comprising:
   identifying one or more candidate PDSCH receptions for a semi-static hybrid automatic repeat request (HARQ)-acknowledgement (ACK) codebook, based on the one or more rows to which the generated row is added;
   identifying one or more HARQ-ACK information bits of the semi-static HARQ-ACK codebook based on the one or more candidate PDSCH receptions; and
   transmitting, to a base station, uplink control information (UCI) including the one or more HARQ-ACK information bits on a physical uplink control channel (PUCCH).

4. The method of claim 3,
   wherein the one or more HARQ-ACK information bits indicate ACK or negative-ACK (NACK) for the one or more candidate PDSCH receptions, respectively, and
   wherein a location for each of the one or more HARQ-ACK information bits in the semi-static HARQ-ACK codebook is based on the one or more candidate PDSCH receptions.

5. The method of claim 3, further comprising:
   receiving, from a base station, information for a set of one or more HARQ-ACK timing values,
   wherein the one or more candidate PDSCH receptions are further identified based on the set of the one or more HARQ-ACK timing values, and
   wherein a resource of the PUCCH is determined based on information indicating the resource included in downlink control information (DCI).

6. A terminal in a communication system, the terminal comprising:
   a transceiver; and
   a controller configured to:
      identify whether a slot offset of a row among one or more rows for physical downlink shared channel (PDSCH) time domain resource allocation (TDRA) is 0,
      identify whether a start symbol index of a physical downlink control channel (PDCCH) monitoring occasion of the terminal is greater than 0, in case that the slot offset of the row is 0,
      generate a row by replacing a start symbol index of the row with a sum of the start symbol index of the PDCCH monitoring occasion and the start symbol index of the row, in case that the start symbol index of the PDCCH monitoring occasion is greater than 0, and
      add the generated row to the one or more rows.

7. The terminal of claim 6, wherein each of the one or more rows corresponds to a slot offset from a slot allocated for a PDCCH scheduling a PDSCH to a slot allocated for the PDSCH, a start symbol index of the PDSCH, and a length of the PDSCH.

8. The terminal of claim 6, wherein the controller is further configured to:
   identify one or more candidate PDSCH receptions for a semi-static hybrid automatic repeat request (HARQ)-acknowledgement (ACK) codebook, based on the one or more rows to which the generated row is added;
   identify one or more HARQ-ACK information bits of the semi-static HARQ-ACK codebook based on the one or more candidate PDSCH receptions; and
   transmit, to a base station via the transceiver, uplink control information (UCI) including the one or more HARQ-ACK information bits on a physical uplink control channel (PUCCH).

9. The terminal of claim 8,
   wherein the one or more HARQ-ACK information bits indicate ACK or negative-ACK (NACK) for the one or more candidate PDSCH receptions, respectively, and
   wherein a location for each of the one or more HARQ-ACK information bits in the semi-static HARQ-ACK codebook is based on the one or more candidate PDSCH receptions.

10. The terminal of claim 8,
    wherein the controller is further configured to:
       receive, from a base station via the transceiver, information for a set of one or more HARQ-ACK timing values,
    wherein the one or more candidate PDSCH receptions are further identified based on the set of the one or more HARQ-ACK timing values, and
    wherein a resource of the PUCCH is determined based on information indicating the resource included in downlink control information (DCI).

11. A method performed by a base station in a communication system, the method comprising:
    identifying whether a slot offset of a row among one or more rows for physical downlink shared channel (PDSCH) time domain resource allocation (TDRA) is 0;
    identifying whether a start symbol index of a physical downlink control channel (PDCCH) monitoring occasion of a terminal is greater than 0, in case that the slot offset of the row is 0;
    generating a row by replacing a start symbol index of the row with a sum of the start symbol index of the PDCCH monitoring occasion and the start symbol index of the row, in case that the start symbol index of the PDCCH monitoring occasion is greater than 0; and
    adding the generated row to the one or more rows.

12. The method of claim 11, wherein each of the one or more rows corresponds to a slot offset from a slot allocated for a PDCCH scheduling a PDSCH to a slot allocated for the PDSCH, a start symbol index of the PDSCH, and a length of the PDSCH.

13. The method of claim 11, further comprising:
    identifying one or more candidate PDSCH transmissions for a semi-static hybrid automatic repeat request (HARQ)-acknowledgement (ACK) codebook, based on the one or more rows to which the generated row is added; and receiving, from the terminal, uplink control information (UCI) including one or more HARQ-ACK information bits of the semi-static HARQ-ACK codebook on a physical uplink control channel (PUCCH), wherein the one or more HARQ-ACK information bits are identified based on the one or more candidate PDSCH transmissions.

14. The method of claim 13, wherein the one or more HARQ-ACK information bits indicate ACK or negative-ACK (NACK) for the one or more candidate PDSCH transmissions, respectively, and wherein a location for each of the one or more HARQ-ACK information bits in the semi-static HARQ-ACK codebook is based on the one or more candidate PDSCH transmissions.

15. The method of claim 13, further comprising:

transmitting, to the terminal, information for a set of one or more HARQ-ACK timing values, wherein the one or more candidate PDSCH transmissions are further identified based on the set of the one or more HARQ-ACK timing values, and wherein a resource of the PUCCH is determined based on information indicating the resource included in downlink control information (DCI).

16. A base station in a communication system, the base station comprising:

a transceiver; and a controller configured to:

identify whether a slot offset of a row among one or more rows for physical downlink shared channel (PDSCH) time domain resource allocation (TDRA) is 0, identify whether a start symbol index of a physical downlink control channel (PDCCH) monitoring occasion of a terminal is greater than 0, in case that the slot offset of the row is 0, generate a row by replacing a start symbol index of the row with a sum of the start symbol index of the PDCCH monitoring occasion and the start symbol index of the row, in case that the start symbol index of the PDCCH monitoring occasion is greater than 0, and add the generated row to the one or more rows.

17. The base station of claim 16, wherein each of the one or more rows corresponds to a slot offset from a slot allocated for a PDCCH scheduling a PDSCH to a slot allocated for the PDSCH, a start symbol index of the PDSCH, and a length of the PDSCH.

18. The base station of claim 16, wherein the controller is further configured to:

identify one or more candidate PDSCH transmissions for a semi-static hybrid automatic repeat request (HARQ)-acknowledgement (ACK) codebook, based on the one or more rows to which the generated row is added, and receive, from the terminal via the transceiver, uplink control information (UCI) including one or more HARQ-ACK information bits of the semi-static HARQ-ACK codebook on a physical uplink control channel (PUCCH), and wherein the one or more HARQ-ACK information bits are identified based on the one or more candidate PDSCH transmissions.

19. The base station of claim 18, wherein the one or more HARQ-ACK information bits indicate ACK or negative-ACK (NACK) for the one or more candidate PDSCH transmissions, respectively, and wherein a location for each of the one or more HARQ-ACK information bits in the semi-static HARQ-ACK codebook is based on the one or more candidate PDSCH transmissions.

20. The base station of claim 18, wherein the controller is further configured to:

transmit, to the terminal via the transceiver, information for a set of one or more HARQ-ACK timing values, wherein the one or more candidate PDSCH transmissions are further identified based on the set of the one or more HARQ-ACK timing values, and wherein a resource of the PUCCH is determined based on information indicating the resource included in downlink control information (DCI).

* * * * *